United States Patent [19]

Treves et al.

[11] Patent Number: 5,573,847
[45] Date of Patent: Nov. 12, 1996

[54] MAGNETO-OPTIC DISK EXHIBITING A PHASE SHIFT BETWEEN PLUS AND MINUS TWELVE DEGREES AND A REFLECTIVITY BETWEEN FIFTEEN AND TWENTY-FIVE PERCENT

[75] Inventors: David Treves, Palo Alto; Tu Chen, Monte Sereno, both of Calif.

[73] Assignee: Komag, Inc., Milpitas, Calif.

[21] Appl. No.: 333,582

[22] Filed: Nov. 2, 1994

Related U.S. Application Data

[63] Continuation of Ser. No. 615,560, Nov. 19, 1990, abandoned, which is a continuation-in-part of Ser. No. 582,719, Sep. 14, 1990, abandoned.

[51] Int. Cl.$^6$ .............................. G11B 5/66; B32B 5/16
[52] U.S. Cl. ............. 428/332; 428/336; 428/694 DE; 428/684 XS; 428/684 NF; 428/694 RL; 428/694 ML; 428/900; 369/13
[58] Field of Search ................ 428/336, 694 DE, 428/694 XS, 694 NF, 694 RL, 694 ML, 900, 332; 369/13

[56] References Cited

U.S. PATENT DOCUMENTS

| | | | |
|---|---|---|---|
| 4,414,650 | 11/1983 | Ohta et al. | 365/122 |
| 4,466,035 | 8/1984 | Connell et al. | 360/114 |
| 4,531,183 | 7/1985 | Morimoto et al. | 346/135.1 |
| 4,569,881 | 2/1986 | Freese et al. | 428/213 |
| 4,586,092 | 4/1986 | Martens et al. | 360/59 |
| 4,596,740 | 6/1986 | Tsukane | 428/336 |
| 4,610,912 | 9/1986 | Takahashi et al. | 428/213 |
| 4,628,485 | 12/1986 | Tanaka et al. | 365/122 |
| 5,055,353 | 10/1991 | Yomamoto et al. | 428/336 |

FOREIGN PATENT DOCUMENTS

| | | |
|---|---|---|
| 0111988A1 | 6/1984 | European Pat. Off. . |
| 111988 | 6/1984 | European Pat. Off. . |
| 0127243A1 | 12/1984 | European Pat. Off. . |
| 139474 | 5/1985 | European Pat. Off. . |
| 161807 | 11/1985 | European Pat. Off. . |
| 0 426 864A1 | 5/1991 | European Pat. Off. ............ 11/10 |
| 171140 | 7/1989 | Japan . |
| 2246034 | 10/1990 | Japan ........................ 11/10 |
| 2081537 | 2/1982 | United Kingdom . |
| 2127611 | 4/1984 | United Kingdom . |
| WO90/11602 | 10/1990 | WIPO ........................ 11/10 |

OTHER PUBLICATIONS

"Magneto-Optical Disk With Reflecting Layers", Ohta et al., SPIE, vol. 382, pp. 252–259 (1983).

"Computer Modeling of Optical Storage Media and Systems", M. Mansuripur, Optical Data Storage, pp. 38–41 (1990).

"Design Concept of Magneto-Optical Disk", Tamada et al., ISOM, p. 27D-9 (1989).

"Design and Characterization of a Quadrilayer Magneto-Optic Disk", McDaniel et al., IEEE Transactions on Magnetics, vol. 24, No. 6, pp. 2467–2469 Nov. 1988.

"Signal-to-Noise in magneto-optic storage", Mansuripur et al., SPIE, vol. 329, pp. 215–222 (1982).

"Signal and noise in magneto-optical readout", Mansuripur et al., Journal of Applied Physics, vol. 53, No. 6, pp. 4485–4494 (Jun. 1982).

"High quality magneto-optical disk", Takahashi et al., SPIE, vol. 695, pp. 65–71 (1986).

*Primary Examiner*—Leszek Kiliman
*Attorney, Agent, or Firm*—Skjerven, Morrill, MacPherson, Franklin & Friel

[57] ABSTRACT

An optimal structure for a quadrilayer magneto-optic data storage medium is described. The structure has superior characteristics of signal to noise, reflectivity, ellipticity, write sensitivity, and stability.

8 Claims, 3 Drawing Sheets

MAGNETO-OPTIC DISK EXHIBITING A PHASE SHIFT BETWEEN PLUS AND MINUS TWELVE DEGREES AND A REFLECTIVITY BETWEEN FIFTEEN AND TWENTY-FIVE PERCENT

This application is a continuation of application Ser. No. 07/615,560, filed Nov. 19, 1990, abandoned, which is a continuation-in-part of application Ser. No. 07/582,719, filed Sep. 14, 1990, abandoned.

BACKGROUND OF THE INVENTION

This invention relates to magneto-optic recording media which are capable of storing digital information by means of the thermal magnetic recording principle.

Figure 1:
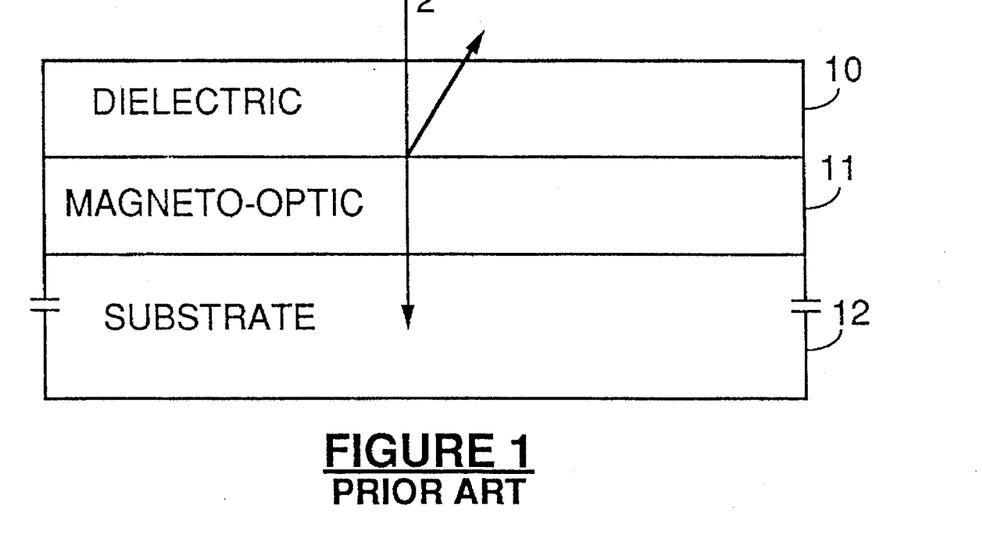
FIG. 1 illustrates in cross section the structure of a bilayer magneto-optic storage medium.

Several structures have been used in fabricating magneto-optic data storage media. One of the simplest structures, shown in FIG. 1, includes a substrate 12, a magneto-optic layer 11, and a first dielectric layer 10. As with the other structures discussed below, the magneto-optic layer is typically a polycrystalline thin film of MnBi, MnSb, MnCuBi, or MnTiBi; an amorphous rare earth-metal alloy such as TbFeCo, GdCo, GdFe, TbFe, GdTbFe, DyFe, or TbDyFe; or a multilayer film such as alternating thin films of Pt and Co. As shown in FIG. 1, the magneto-optic layer is sandwiched between a substrate material and a dielectric layer to provide a storage function based on the direction of magnetization in different regions of the magneto-optic layer. The digital information stored in magneto-optic layer 11 is read by directing a polarized laser beam 2 through dielectric layer 10 to magneto-optic layer 11, where it is partially reflected. An external lens (not shown) focuses laser beam 2 on magneto-optic layer 11. Depending on the magnetization direction of the segment of magneto-optic layer 11 from which laser beam 2 is reflected, the polarization direction of the reflected portion of laser beam 2 will rotate through either a positive or a negative angle, as a result of the Kerr effect. An external sensing device (not shown) reads the information stored in magneto-optic layer 11 by detecting the direction of the angular rotation of the reflected laser beam 2.

Several characteristics are significant in evaluating the performance of a magneto-optic storage medium. Among these are the signal-to-noise ratio of the reflected light beam, the ease of writing on the medium, the reliability of the medium in storing data, the susceptibility of the magneto-optic layer to corrosion, the prevention of interference from dust particles on the surface of the medium, and the reflectivity of the medium, which is important for tracking purposes.

While the structure shown in FIG. 1 is relatively easy to construct, it is vulnerable to interference from dust particles on the upper surface of dielectric layer 10, and its signal-to-noise performance is less than desirable. An improved signal-to-noise ratio is exhibited by the quadrilayer structure shown in FIG. 2, which includes a second dielectric layer 13 and a metallic reflecting layer 14 sandwiched between magneto-optic layer 11 and substrate 12. Reflecting layer 14 typically consists of a thin film of a metal such as Al, Cu, Ag or Au. In this structure, the portion of laser beam 2 which passes through magneto-optic layer 11 and second dielectric layer 13 is reflected at the surface of reflecting layer 14. Provided that the thickness of second dielectric layer 13 is set properly, the portions of laser beam 2 that are reflected at the interface of magneto-optic layer 11 and second dielectric layer 13 and the interface of second dielectric layer 13 and metal reflecting layer 14, respectively, interfere constructively so as to magnify the Kerr rotation of the reflected light, thereby improving the signal-to-noise ratio.

Figure 2:
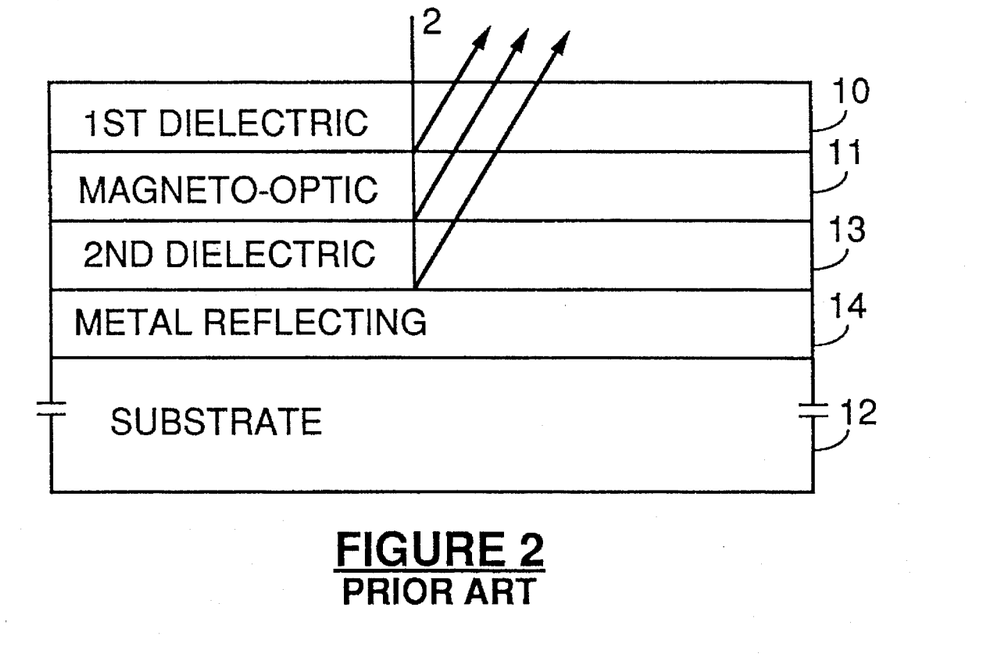
FIG. 2 illustrates in cross section the structure of a quadrilayer magneto-optic storage medium fabricated with the supporting substrate on the side away from the incident laser beam.
Figure 3:
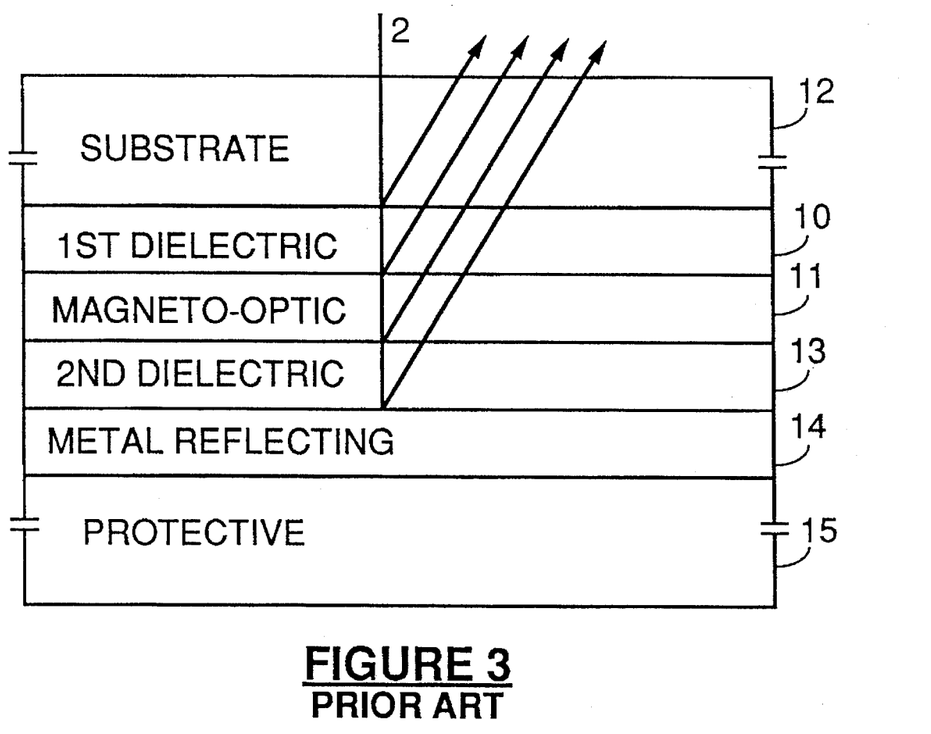
FIG. 3 illustrates in cross section the structure of a quadrilayer magneto-optic storage medium fabricated with the supporting substrate on the same side as the incident laser beam.

FIG. 3 shows an alternative structure which has the additional advantage of being less susceptible to interference from dust contamination. The structure shown in FIG. 3 is identical to that shown in FIG. 2, except that substrate 12 is positioned on the side of the quadrilayer stack upon which the laser beam is incident. Layers 10, 11, 13 and 14 function in the same manner as in the arrangement of FIG. 2. A particle of dust on the upper surface of substrate 12 is far above the focal point of laser beam 2, which is in magneto-optic layer 11. Therefore, unless the particle is extremely large, it will not affect the performance of the disk. Furthermore, if substrate 12 and first dielectric layer 10 are made of materials which have refractive indexes of approximately 1.5 and 2, respectively, the positioning of first dielectric layer 10 immediately beneath substrate 12 will help to reduce the portion of laser beam 2 (not shown) which is reflected before it reaches magneto-optic layer 11. This leads to a stronger reflected signal. Also, first dielectric layer 10 acts as a barrier to protect magneto-optic layer 11 from corrosion as a result of humidity or contamination from substrate 12. This quadrilayer structure realizes almost the same improved signal-to-noise performance as the structure of FIG. 2.

Despite the improvements inherent in the quadrilayers shown in FIGS. 2 and 3, until now structures of this type which have been designed to maximize the signal-to-noise ratio have exhibited a low degree of reflectivity, often in the range of 4 to 6%, and often an unacceptably large phase shift in the magneto-optically rotated reflected light. The servo-mechanisms used in disk drives for automatic focusing and tracking of the laser beam at present require a reflectivity in the range of 15 to 25%, preferably about 20%.

Phase shift in the reflected light occurs when the respective components of the reflected light parallel and perpendicular to the polarization direction of the incident beam are not in phase, resulting in elliptical polarization. Such phase shift (or ellipticity) in the reflected signal creates detection problems. If $\phi$ represents the phase shift of the reflected light, i.e., the phase difference between the magneto-optic reflected light component and the normal reflected light component, the performance of the information reading operation varies in proportion to cos $\phi$. Therefore, a value of $\phi$ equal to zero is ideal, but a value of $\phi$ in the range of about $-12°$ to $+12°$ is considered satisfactory.

Although optical retardation plates are available to reduce or eliminate ellipticity, the utility of an individual plate is limited to a particular value of $\phi$. Hence, retardation plates are not a practical solution to the problem, since the value of $\phi$ may vary widely between different storage media. Therefore, the multilayer structure has to be made so that the phase shift $\phi$ is essentially zero in order to ensure interchangeability among different media and drives.

Several studies have attempted to find an optimum quadrilayer structure in terms of the composition and thickness of each layer. See, for example, articles entitled "Design Concept of Magneto-Optical Disk", by Tamada et al., Internal Symposium on Optical Memory, Sept. 26–28, 1989, Kobe, Japan, p. 83; "Magneto-optical disk with reflecting layers", Ohta et al., SPIE, Vol. 382, p. 252, 1983; "High quality magneto-optical disk", by Takahashi et al., SPIE, Vol. 695, p. 65, 1986, all of which articles are incorporated herein by reference in their entirety.

SUMMARY OF THE INVENTION

Accordingly, it is an object of this invention to provide an improved quadrilayer magneto-optic storage medium.

Another object of this invention is to provide a magneto-optic storage medium in which the ellipticity of the reflected light is minimized; the reflectivity of the structure is in the desirable range of 15% to 25%; the signal-to-noise ratio is maximized; the write power sensitivity is in the appropriate range (less than 16 mW of laser power for a pulse width of 50 nS); and the stability of the information stored in the medium is high even after long periods of continuous readout and under adverse magnetic fields.

A further object of this invention is to provide a quadrilayer magneto-optic medium which, in addition to the foregoing advantages, allows information to be recorded at a high density on the medium.

In a quadrilayer magneto-optic storage medium fabricated according to this invention, the composition and thicknesses of the dielectric layers, the magneto-optic layer and the metallic reflecting layer are adjusted so as to optimize the reflectivity, signal-to-noise ratio, ellipticity, ease of writing and stability characteristics of the structure, as described above. Among other things, the dielectric layer adjacent the reflecting layer consists of a thin layer (no more than about 400 Å thick) formed of a material having a low thermal conductivity. The thickness of the metallic reflective layer is adjusted so as to minimize heat dissipation during the writing operation while providing sufficient reflectivity.

DETAILED DESCRIPTION OF THE INVENTION

We have found that certain quadrilayer structures in which the thickness of the dielectric layer adjacent the metal reflecting layer is in the range of (A) 50–400 Å, or (B) 50–400 Å plus one-half the wavelength of the incident light, have very desirable levels of reflectivity and phase shift. This has been found true for structures in which the metal reflective layer consists of Al, Cu, Ag or Au and in which the dielectric layer adjacent the metal reflective layer has a refractive index of 1.4 or more. (Referring to FIGS. 2 and 3, first dielectric layer 10 will sometimes be referred to hereinafter simply as the "first dielectric layer" and second dielectric layer 13 will sometimes be referred to simply as the "second dielectric layer.")

In reality, dielectric layer thicknesses in the range of condition (B) above are not practical. Since the wavelength of the incident light beam is typically on the order of 8000 Å in vacuum, condition (B) would require a second dielectric layer 13 thickness in the range of 2000–4000 Å. Fabrication of such a layer is not practical because it would require an excessive deposition time which might also result in an excessive temperature rise in the storage disk during sputtering. In addition, the expense of fabricating such a layer would be formidable.

A different problem attends the use of a second dielectric layer having a thickness of only 50–400 Å, as in condition (A) above. A second dielectric layer of this small dimension might allow excessive heat transfer from the magneto-optic layer to the metal reflecting layer during data recording. The heat absorbed by the highly heat-conductive metal reflecting layer would quickly diffuse over a wide area. Thus, if the thickness of the second dielectric layer is too small, the result might be to widen the recorded bit area, prevent high density recording and require high laser power for writing.

This problem is known to those familiar with this art. For example, the Tamada et al. article cited above recognizes that the ellipticity of the reflected light becomes "smaller for thinner [second] SiN [dielectric] layer," but because of "intersymbolic interference between written pits," which renders the stack "not suitable for higher density recording," Tamada et al. settle on a compromise thickness of 500 Å for second dielectric layer. Takahashi et al., cited above, experimented with a second dielectric layer 250 Å thick, but the reflectivity of their medium was only about 10%, which is substantially lower than necessary for effective tracking.

Figure 4:
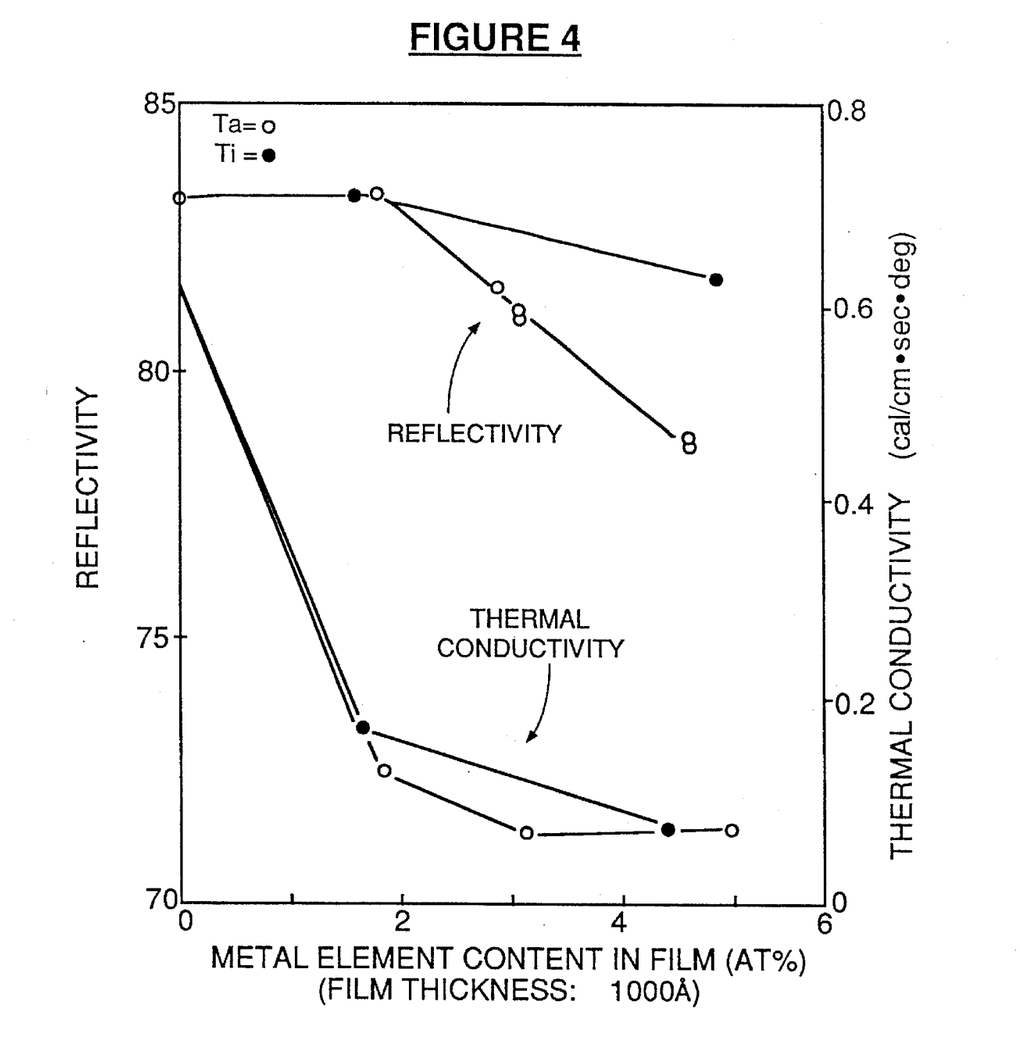
FIG. 4 contains a graph showing the reflectivity and thermal conductivity of Al-Ti and Al-Ta alloys as compared with pure Al.

We have found that unacceptable results such as these can be avoided by taking the following steps. First, the second dielectric layer is constructed of an amorphous or other material which has a low thermal conductivity (less than 0.06 Joules/sec-cm-°K). Examples of such materials are $ZrO_2$—$Y_2O_3$—$Al_2O_3$ mixture, $SiO_2$ and ZnS. Second, the thickness of the metal reflecting layer is reduced to the point where lateral heat dissipation is minimized while the layer continues to provide an adequate reflective function. The metal reflecting layer can consist of, for example, Al, Cu, Ag or Au, in pure form or alloyed with other metals. An Al alloy with a few percent (1%–6%) of Ti or Ta is particularly suitable, since these alloys have a thermal conductivity which is substantially lower than that of pure Al, while their reflectivity is essentially the same (see FIG. 4). This further reduces lateral heat conduction in the metal reflecting layer.

Where the metal reflecting layer is exposed, a dielectric layer 15 may be added to protect the metal reflecting layer, as shown in FIG. 3. Dielectric layer 15 may preferably consist of an amorphous or other material such as a $ZrO_2$—$Y_2O_3$—$Al_2O_5$ mixture, $SiO_2$ or ZnS. All of the dielectric layers may be deposited by RF magnetron or RF diode sputtering, reactive sputtering or ion beam plating.

The characteristics of a quadrilayer storage medium constructed in accordance with this invention depend on the composition and thickness of each layer. While the discussion has focused on the characteristics of the second dielectric and metallic layers in particular, an optimized quadrilayer structure requires that the characteristics of the first dielectric layer and the magneto-optic layer otherwise be adjusted so as to bring them into an advantageous relationship with the other layers.

A preferred embodiment of the invention has been fabricated with a sputtering system which uses three stationary targets: the first target consists of 85 wt. % of $ZrO_2$, 5 wt. % of $Y_2O_3$ and 10 wt. % of $Al_2O_5$ (wt. % represents percentage by weight) (this material is designated "ZYA" and is described in U.S. patent application Ser. No. 07/582,719, now abandoned, incorporated herein by reference); the second target consists of 21.5 at % of Tb, 83.5 at % of Fe and 5 at % of Co (at % represents atomic percentage); the third target is Al. The targets are typically 8 inches in diameter. Disks of glass, polycarbonate or another suitable substrate material are transferred from one target to another and coated with an appropriate thickness of the target material. The ZYA target is initially sputtered using an RF magnetron at 1.0 kW in an argon atmosphere of 4 mTorr for 73 seconds, producing a first dielectric layer ZYA about 550 Å thick. The argon pressure is then increased to about 5 mTorr, and the $Tb_{21.5}Fe_{83.5}Co_5$ target is sputtered using an RF diode at 0.4 kW for 75 seconds, producing a magneto-optic layer of TbFeCo about 300 Å thick. A second dielectric layer of about 120 Å in thickness is then deposited by sputtering the ZYA target with an RF magnetron at 0.4 kW for 36 seconds at 4 mTorr. The metal layer is formed at a thickness of 350 Å by sputtering the Al target with a DC magnetron at 0.5 kW for 24 seconds in a 5 mTorr argon atmosphere. Finally, the ZYA target is RF magnetron-sputtered at 1.0 kW for 53 seconds to produce a 370 Å thick protective layer (argon pressure is again 4 mTorr). The specifications and results of the foregoing process are summarized in Table 1.

TABLE 1

| Layer No. (FIG. 3) | Target Composition | Argon Pressure (mTorr) | Sputter Power (kW) | Sputter Time (sec) | Nominal Layer Thickness (Å) |
| --- | --- | --- | --- | --- | --- |
| 10 | $Zirconia_{85}$ $Yttria_5$ $Alumina_{10}$ weight % (ZYA) | 4 | RF magnetron-1.0 | 73 | 550 |
| 11 | $Tb_{21.5}Co_5Fe_{83.5}$ At % | 5 | RF diode-0.4 | 75 | 300 |
| 13 | ZYA | 4 | RF magnetron-0.4 | 36 | 120 |
| 14 | Aluminum | 5 | DC magnetron-0.5 | 24 | 350 |
| 15 | ZYA | 4 | RF magnetron-1.0 | 53 | 370 |

Magneto-optic storage media fabricated in this manner have been found experimentally to have a reflectivity of about 20%, a very small ellipticity of the reflected beam, and a high signal-to-noise ratio. The writing power is 10 mW to 13 mW using pulse widths of 50 nS to 80 nS, a focusing lens with a numerical aperture of 0.53, and a writing magnetic field of 300 Oe. The properties of this medium are summarized in Table 2.

TABLE 2

| | |
| --- | --- |
| Reflectivity (R) | 19% to 21% |
| Figure of merit (K) which is equal to $\Theta \sqrt{R}$, where $\Theta$ is the magneto-optic Kerr rotation | $7.3 \times 10^{-3}$ to $8.5 \times 10^{-3}$ |
| Write Power (50 ns pulses and magnetic field of 300 Oe | 10 mW to 13 mW |
| Carrier/Noise ratio (in 5 MHz bandwidth, on land, with a read power of 1.5 mW) | 30 dB |

The process of sputtering can also be performed in a commercial in-line sputtering system such as the ULVAC Model No. SM008C or SM018C manufactured by ULVAC of Japan. In this type of sputtering system, a chamber contains a series of sputtering targets past which the substrate is moved sequentially. The process specifications would be as described above.

Beyond the specific embodiment which has just been described, we have found a range of structures (i.e., layer thicknesses and refractive indices) which exhibit highly acceptable characteristics, that is, a high ratio of signal-to-noise, low phase shift, proper reflectivity and write power sensitivity, and capable of sustaining a high density of recording. In identifying the range of structures which have these desirable characteristics, we were guided by computer calculations based on known mathematical relationships concerning the interaction of circularly polarized light normally incident on a multi-layer film structure. The basic computation calculates the Fresnel reflection and transmission coefficients at each interface between the layers given the thickness and complex index of refraction of each layer. From the Fresnel coefficients, the reflectivity and transmission of the multilayer structure, the absorption in each of the layers, the figure of merit of the total structure, and the phase shift between the two polarization components are calculated. As noted, these relationships are known in the art and are discussed, among other places, in articles entitled "Signal and noise in magneto-optical readout", Mansuripur et al., Journal of Applied Physics, Vol. 53, No. 6, June 1982; "Magneto-optical disk with reflecting layers", Ohta et al., SPIE, Vol. 382, p. 252, 1983; and "Design and Characterization of a Quadrilayer Magneto-Optic Disk", McDaniel et al., IEEE Transactions on Magnetics, Vol. 24, No. 6, November 1988. Each of the foregoing articles is incorporated herein by reference.

A copy of the computer program we used is enclosed as Appendix A.

Tables 3–9 contain illustrations of structures that have been determined to possess desirable characteristics through computations performed with this program. In the tables, x(t)=the thickness of the first dielectric layer (Å)

MO=the thickness of the magneto-optic layer (Å)

x(b)=the thickness of the second dielectric layer (Å)

m=the thickness of the metal reflecting layer (Å)

$n_1$ =the refractive index of the first dielectric layer $n_2$=the refractive index of the second dielectric layer $n_{mo}$=the refractive index of the magneto-optic layer R=the reflectivity of the structure (%)

K=the magneto-optic figure of merit of the structure. K=$\Theta \sqrt{R}$, where $\Theta$ is the magneto-optic Kerr rotation.

φ=the phase shift (degrees)

Vsat=$\sqrt{R} \cdot 100 \cdot |K| \cdot \cos \phi \cdot$Vsat is proportional to the amplitude of the readout signal.

In Tables 3 and 4, the metal reflecting layer is an Al layer 400 Å thick, and the refractive index of the first and second dielectric layers is 2.1 (e.g., ZYA).

In Table 5, the metal reflecting layer is an Al layer 400 Å thick, the refractive index of the first dielectric layer is 2.1, and the refractive index of the second dielectric layer is 1.5.

In Tables 6 and 7, the metal reflecting layer is a Cu layer 400 Å thick, and the refractive index of the first and second dielectric layers is 2.1.

In Table 8, the metal reflecting layer is a Cu layer 400 Å thick, the refractive index of the first dielectric layer is 2.1, and the refractive index of the second dielectric layer is 1.5.

In Table 9, the metal reflecting layer consists of Al, and the refractive index of both dielectric layers is 2.0. This table clearly demonstrates that the overall optical properties of the structure do not deteriorate appreciably when the metal reflecting layer is made very thin.

In each of the tables, the magneto-optic layer has principal refractive indices of 3.72+i3.88 and 3.62+i3.83.

The manner of using the tables will be evident to those skilled in the art. For example, if it is desired to determine the characteristics of a quadrilayer structure which includes a metal reflecting layer Al 400 Å thick; a magneto-optic layer having the above principal refractive indices and 300 Å thick, a first dielectric layer having a refractive index of 2.1 (ZYA) and 750 Å thick; and a second dielectric layer of ZYA and 100 Å thick, Table 3 indicates that this structure will have a reflectivity R=19%, a figure of merit K=6.9× $10^{-3}$, a phase shift $\emptyset$=−6°, and Vsat=0.302 (see arrow). If the thickness of the dielectric layer is increased from 750 Å to 850 Å, the reflectivity and figure of merit will remain the same while the phrase shift $\emptyset$ will fall to −1° and Vsat will increase to 0.304.

While the invention has been described with respect to specific embodiments, those skilled in the art will appreciate that changes may be made in form and detail without departing from the spirit and scope of the invention. For example, a variety of deposition techniques may be used to form the various layers of a magneto-optic storage medium. In addition, materials other than those listed may be used for the magneto-optic layer, the first and second dielectric layers, and the metal reflecting layer. Other layers may also be incorporated into a magneto-optic storage medium, e.g., to facilitate adhesion of the various structures within the device. Accordingly, all such changes come within the scope of this invention.

TABLE 3

| MO = | | 200Å | | | | 250Å | | | | 300Å | | | | 350Å | | | |
|---|---|---|---|---|---|---|---|---|---|---|---|---|---|---|---|---|---|
| x(t) | x(b) | R | $\|K\| \cdot 10^3$ | φ | Vsat | R | $\|K\| \cdot 10^3$ | φ | Vsat | R | $\|K\| \cdot 10^3$ | φ | Vsat | R | $\|K\| \cdot 10^3$ | φ | Vsat |
| 50 | 100 | 38 | 4.9 | 11 | 0.301 | 37 | 5.2 | −2 | 0.315 | 37 | 5.2 | −10 | 0.311 | 37 | 5.1 | −17 | 0.298 |
|  | 200 | 32 | 5.6 | −2 | 0.326 | 33 | 5.7 | −14 | 0.318 | 34 | 5.5 | −22 | 0.300 | 36 | 5.2 | −27 | 0.278 |
|  | 300 | 27 | 6.4 | −15 | 0.321 | 30 | 6.0 | −25 | 0.302 | 33 | 5.7 | −31 | 0.278 | 36 | 5.2 | −36 | 0.254 |
|  | 400 | 24 | 6.7 | −26 | 0.299 | 29 | 6.2 | −34 | 0.276 | 32 | 5.7 | −39 | 0.251 | 35 | 5.2 | −42 | 0.230 |
| 250 | 100 | 36 | 5.2 | 9 | 0.306 | 35 | 5.4 | −3 | 0.328 | 35 | 5.4 | −12 | 0.322 | 35 | 5.3 | −29 | 0.298 |
|  | 200 | 29 | 6.0 | −5 | 0.325 | 32 | 5.9 | −16 | 0.316 | 32 | 5.7 | −24 | 0.296 | 34 | 5.4 | −30 | 0.275 |
|  | 300 | 25 | 6.6 | −17 | 0.315 | 28 | 6.2 | −27 | 0.295 | 31 | 5.8 | −34 | 0.271 | 34 | 5.4 | −38 | 0.249 |
|  | 400 | 22 | 6.9 | −29 | 0.287 | 27 | 6.4 | −37 | 0.266 | 31 | 5.9 | −42 | 0.243 | 34 | 5.4 | −45 | 0.223 |
| 250 | 100 | 33 | 5.4 | 8 | 0.310 | 32 | 5.7 | −4 | 0.319 | 32 | 5.7 | −14 | 0.312 | 33 | 5.6 | −22 | 0.297 |
|  | 200 | 27 | 6.3 | −6 | 0.323 | 28 | 6.2 | −18 | 0.312 | 30 | 6.0 | −26 | 0.293 | 31 | 5.7 | −31 | 0.272 |
|  | 300 | 22 | 6.8 | −19 | 0.306 | 26 | 6.5 | −29 | 0.287 | 29 | 6.1 | −36 | 0.265 | 31 | 5.7 | −40 | 0.244 |
|  | 400 | 20 | 7.2 | −31 | 0.273 | 24 | 6.7 | −39 | 0.255 | 28 | 6.2 | −44 | 0.234 | 31 | 5.6 | −46 | 0.216 |
| 350 | 100 | 30 | 5.7 | 7 | 0.312 | 29 | 6.0 | −5 | 0.319 | 29 | 6.0 | −15 | 0.311 | 29 | 5.9 | −22 | 0.296 |
|  | 200 | 23 | 6.6 | −7 | 0.317 | 25 | 6.5 | −19 | 0.307 | 27 | 6.3 | −27 | 0.288 | 28 | 6.0 | −32 | 0.266 |
|  | 300 | 19 | 7.2 | −21 | 0.295 | 23 | 6.8 | −31 | 0.278 | 26 | 6.4 | −37 | 0.258 | 28 | 6.0 | −41 | 0.239 |
|  | 400 | 17 | 7.5 | −33 | 0.258 | 21 | 7.0 | −41 | 0.243 | 25 | 6.5 | −45 | 0.226 | 28 | 5.9 | −48 | 0.211 |
| 450 | 100 | 27 | 6.0 | 8 | 0.310 | 26 | 6.3 | −5 | 0.317 | 26 | 6.3 | −15 | 0.309 | 26 | 6.2 | −22 | 0.293 |
|  | 200 | 20 | 6.9 | −7 | 0.309 | 22 | 6.8 | −19 | 0.301 | 23 | 6.6 | −27 | 0.284 | 25 | 6.3 | −33 | 0.265 |
|  | 300 | 16 | 7.5 | −20 | 0.282 | 19 | 7.1 | −31 | 0.269 | 22 | 6.7 | −37 | 0.252 | 25 | 6.3 | −42 | 0.235 |
|  | 400 | 14 | 7.8 | −33 | 0.244 | 18 | 7.3 | −41 | 0.233 | 22 | 6.8 | −46 | 0.220 | 25 | 6.2 | −48 | 0.207 |
| 550 | 100 | 24 | 6.3 | 9 | 0.304 | 23 | 6.6 | −3 | 0.312 | 23 | 6.6 | −13 | 0.305 | 23 | 6.5 | −21 | 0.291 |
|  | 200 | 17 | 7.2 | −5 | 0.300 | 19 | 7.1 | −17 | 0.294 | 20 | 6.9 | −26 | 0.280 | 22 | 6.6 | −31 | 0.263 |
|  | 300 | 14 | 7.7 | −18 | 0.272 | 16 | 7.4 | −29 | 0.262 | 19 | 7.0 | −36 | 0.249 | 22 | 6.6 | −40 | 0.234 |
|  | 400 | 11 | 8.0 | −32 | 0.232 | 15 | 7.6 | −40 | 0.227 | 19 | 7.2 | −45 | 0.217 | 22 | 6.5 | −47 | 0.206 |
| 650 | 100 | 22 | 6.5 | 12 | 0.297 | 20 | 6.8 | −0 | 0.307 | 20 | 6.8 | −10 | 0.302 | 21 | 6.7 | −18 | 0.291 |
|  | 200 | 15 | 7.4 | −1 | 0.291 | 16 | 7.3 | −14 | 0.289 | IS | 7.1 | −23 | 0.278 | 20 | 6.8 | −29 | 0.264 |
|  | 300 | 12 | 7.9 | −14 | 0.263 | 14 | 7.6 | −26 | 0.259 | 17 | 7.3 | −33 | 0.249 | 19 | 6.8 | −38 | 0.236 |
|  | 400 | 09 | 8.2 | −26 | 0.226 | 13 | 7.8 | −37 | 0.225 | 16 | 7.3 | −42 | 0.219 | 19 | 6.8 | −45 | 0.209 |
| 750 | 100 | 21 | 6.6 | 17 | 0.289 | 20 | 6.9 | 4 | 0.303 | →19 | 6.9 | −6 | 0.302 | 19 | 6.8 | −14 | 0.292 |
|  | 200 | 15 | 7.5 | 5 | 0.286 | 25 | 7.4 | −9 | 0.289 | 17 | 7.2 | −18 | 0.281 | 18 | 6.9 | −25 | 0.269 |
|  | 300 | 11 | 8.0 | −7 | 0.262 | 13 | 7.8 | −21 | 0.263 | 15 | 7.4 | −29 | 0.255 | 18 | 7.0 | −33 | 0.244 |
|  | 400 | 08 | 8.3 | −19 | 0.229 | 12 | 8.0 | −31 | 0.232 | 15 | 7.5 | −38 | 0.227 | 17 | 6.9 | −41 | 0.219 |
| 850 | 100 | 22 | 6.5 | 21 | 0.284 | 20 | 6.8 | 9 | 0.302 | 19 | 6.9 | −1 | 0.304 | 20 | 6.8 | −9 | 0.298 |
|  | 200 | 15 | 7.4 | 10 | 0.286 | 16 | 7.4 | −3 | 0.293 | 17 | 7.2 | −13 | 0.289 | 18 | 6.9 | −20 | 0.278 |
|  | 300 | 11 | 8.0 | −1 | 0.268 | 13 | 7.8 | −14 | 0.272 | 15 | 7.4 | −23 | 0.267 | 17 | 7.0 | −28 | 0.256 |
|  | 400 | 09 | 8.3 | −11 | 0.240 | 12 | 8.0 | −25 | 0.246 | 14 | 7.5 | −32 | 0.242 | 17 | 7.0 | −36 | 0.233 |
| 950 | 100 | 24 | 6.3 | 24 | 0.281 | 22 | 6.7 | 12 | 0.303 | 21 | 6.7 | 3 | 0.309 | 21 | 6.7 | −5 | 0.305 |
|  | 200 | 17 | 7.2 | 14 | 0.290 | 17 | 7.3 | 1 | 0.301 | 18 | 7.1 | −9 | 0.299 | 19 | 6.8 | −15 | 0.290 |
|  | 300 | 13 | 7.8 | 5 | 0.279 | 14 | 7.6 | −9 | 0.286 | 17 | 7.3 | −28 | 0.281 | 19 | 6.9 | −24 | 0.272 |
|  | 400 | 10 | 8.2 | −5 | 0.258 | 13 | 7.8 | −19 | 0.264 | 16 | 7.4 | −27 | 0.260 | 18 | 6.9 | −31 | 0.250 |
| 1050 | 100 | 26 | 6.1 | 26 | 0.281 | 24 | 6.4 | 14 | 0.306 | 24 | 6.5 | 5 | 0.314 | 24 | 6.4 | −3 | 0.312 |
|  | 200 | 20 | 7.0 | 16 | 0.297 | 20 | 7.0 | 4 | 0.311 | 21 | 6.9 | −6 | 0.310 | 22 | 6.6 | −13 | 0.301 |
|  | 300 | 15 | 7.6 | 7 | 0.294 | 17 | 7.4 | −6 | 0.301 | 19 | 7.1 | −15 | 0.296 | 21 | 6.7 | −21 | 0.284 |
|  | 400 | 12 | 7.9 | −2 | 0.279 | 15 | 7.6 | −15 | 0.284 | 18 | 7.2 | −23 | 0.277 | 20 | 6.7 | −28 | 0.265 |
| 1150 | 100 | 30 | 5.8 | 26 | 0.281 | 28 | 6.1 | 15 | 0.309 | 27 | 6.2 | 6 | 0.318 | 27 | 6.1 | −2 | 0.317 |
|  | 200 | 23 | 6.7 | 17 | 0.305 | 23 | 6.7 | 5 | 0.320 | 24 | 6.6 | −5 | 0.318 | 25 | 6.3 | −11 | 0.308 |
|  | 300 | 18 | 7.3 | 8 | 0.308 | 20 | 7.1 | −5 | 0.314 | 22 | 6.8 | −14 | 0.307 | 24 | 6.4 | −19 | 0.293 |
|  | 400 | 15 | 7.7 | −1 | 0.298 | 18 | 7.3 | −13 | 0.300 | 21 | 6.9 | −21 | 0.291 | 23 | 6.4 | −26 | 0.276 |

Reflecting layer is Al 400Å thick
$n_1 = n_2 = 2.1$  $n_{mc} = 3.72 + i3.88$ and $3.62 + i3.83$

TABLE 4

| MO = | | 150Å | | | | 200Å | | | | 250Å | | | | 300Å | | | |
|---|---|---|---|---|---|---|---|---|---|---|---|---|---|---|---|---|---|
| x(t) | x(b) | R | \|K\|·10³ | φ | Vsat | R | \|K\|·10³ | φ | Vsat | R | \|K\|·10³ | φ | Vsat | R | \|K\|·10³ | φ | Vsat |
| 50 | 0 | 53 | 2.9 | 37 | 0.169 | 48 | 3.7 | 25 | 0.231 | 44 | 4.3 | 14 | 0.274 | 41 | 4.6 | 4 | 0.297 |
| | 100 | 41 | 4.4 | 25 | 0.257 | 38 | 4.9 | 11 | 0.301 | 37 | 5.2 | −1 | 0.315 | 37 | 5.2 | −10 | 0.311 |
| | 200 | 32 | 5.6 | 13 | 0.309 | 32 | 5.8 | −2 | 0.326 | 33 | 5.7 | −14 | 0.318 | 34 | 5.5 | −22 | 0.300 |
| | 300 | 25 | 6.6 | 1 | 0.324 | 27 | 6.4 | −15 | 0.321 | 30 | 6.0 | −25 | 0.302 | 33 | 5.7 | −31 | 0.278 |
| 150 | 0 | 52 | 3.0 | 35 | 0.177 | 46 | 3.9 | 24 | 0.240 | 42 | 4.5 | 13 | 0.282 | 39 | 4.8 | 3 | 0.302 |
| | 100 | 39 | 4.6 | 24 | 0.265 | 36 | 5.2 | 9 | 0.306 | 35 | 5.4 | −3 | 0.318 | 35 | 5.4 | −12 | 0.312 |
| | 200 | 29 | 5.9 | 12 | 0.312 | 29 | 6.0 | −5 | 0.325 | 31 | 5.9 | −16 | 0.316 | 32 | 5.7 | −24 | 0.296 |
| | 300 | 23 | 6.7 | −2 | 0.329 | 25 | 6.6 | −17 | 0.325 | 28 | 6.2 | −27 | 0.295 | 31 | 5.8 | −34 | 0.271 |
| 250 | 0 | 49 | 3.2 | 35 | 0.185 | 43 | 4.1 | 23 | 0.248 | 39 | 4.7 | 12 | 0.289 | 37 | 5.2 | 2 | 0.308 |
| | 100 | 36 | 4.9 | 23 | 0.271 | 33 | 5.4 | 8 | 0.310 | 32 | 5.7 | −4 | 0.320 | 32 | 5.7 | −14 | 0.312 |
| | 200 | 26 | 6.1 | 10 | 0.321 | 27 | 6.3 | −6 | 0.323 | 28 | 6.2 | −18 | 0.312 | 30 | 6.0 | −26 | 0.293 |
| | 300 | 20 | 7.0 | −3 | 0.311 | 22 | 6.8 | −19 | 0.306 | 26 | 6.5 | −29 | 0.287 | 29 | 6.1 | −36 | 0.265 |
| 350 | 0 | 46 | 3.4 | 34 | 0.193 | 40 | 4.4 | 22 | 0.256 | 36 | 5.0 | 11 | 0.295 | 33 | 5.4 | 1 | 0.311 |
| | 100 | 33 | 5.2 | 22 | 0.275 | 30 | 5.7 | 7 | 0.312 | 29 | 6.0 | −5 | 0.319 | 29 | 6.0 | −15 | 0.311 |
| | 200 | 23 | 6.5 | 9 | 0.307 | 23 | 6.6 | −7 | 0.317 | 25 | 6.5 | −19 | 0.307 | 27 | 6.3 | −27 | 0.288 |
| | 300 | 17 | 7.3 | −4 | 0.298 | 19 | 7.2 | −21 | 0.295 | 23 | 6.8 | −31 | 0.278 | 26 | 6.4 | −37 | 0.258 |
| 450 | 0 | 43 | 3.7 | 34 | 0.199 | 37 | 4.6 | 23 | 0.260 | 33 | 5.3 | 11 | 0.297 | 30 | 5.7 | 1 | 0.322 |
| | 100 | 30 | 5.5 | 23 | 0.275 | 27 | 6.0 | 8 | 0.310 | 26 | 6.3 | −5 | 0.317 | 26 | 6.3 | −15 | 0.309 |
| | 200 | 20 | 6.7 | 10 | 0.298 | 20 | 6.9 | −7 | 0.309 | 22 | 6.8 | −29 | 0.301 | 23 | 6.6 | −27 | 0.284 |
| | 300 | 14 | 7.6 | −3 | 0.282 | 16 | 7.5 | −20 | 0.282 | 29 | 7.1 | −31 | 0.269 | 22 | 6.7 | −37 | 0.252 |
| 550 | 0 | 40 | 3.9 | 35 | 0.202 | 34 | 4.9 | 24 | 0.261 | 30 | 5.6 | 13 | 0.297 | 27 | 6.0 | 2 | 0.311 |
| | 100 | 27 | 5.7 | 25 | 0.270 | 24 | 6.3 | 9 | 0.304 | 23 | 6.6 | −3 | 0.312 | 23 | 6.6 | −13 | 0.305 |
| | 200 | 18 | 7.0 | 13 | 0.286 | 17 | 7.2 | −5 | 0.300 | 19 | 7.1 | −17 | 0.294 | 20 | 6.9 | −26 | 0.280 |
| | 300 | 12 | 7.8 | 0 | 0.266 | 14 | 7.7 | −18 | 0.271 | 16 | 7.4 | −29 | 0.262 | 19 | 7.0 | −36 | 0.249 |
| 650 | 0 | 38 | 4.1 | 37 | 0.200 | 32 | 5.1 | 26 | 0.258 | 28 | 5.8 | 15 | 0.293 | 25 | 6.2 | 5 | 0.307 |
| | 100 | 25 | 5.9 | 27 | 0.261 | 22 | 6.5 | 12 | 0.297 | 20 | 6.8 | −0 | 0.307 | 20 | 6.8 | −10 | 0.302 |
| | 200 | 16 | 7.1 | 17 | 0.273 | 15 | 7.4 | −1 | 0.292 | 16 | 7.3 | −14 | 0.289 | 18 | 7.1 | −23 | 0.278 |
| | 300 | 10 | 8.0 | 6 | 0.252 | 12 | 7.9 | −14 | 0.263 | 14 | 7.6 | −26 | 0.259 | 17 | 7.3 | −33 | 0.249 |
| 750 | 0 | 37 | 4.1 | 39 | 0.195 | 31 | 5.2 | 29 | 0.252 | 27 | 5.9 | 18 | 0.287 | 24 | 6.3 | 9 | 0.303 |
| | 100 | 24 | 5.9 | 31 | 0.252 | 21 | 6.6 | 17 | 0.289 | 20 | 6.9 | 4 | 0.303 | 19 | 6.9 | −6 | 0.302 |
| | 200 | 16 | 7.2 | 22 | 0.263 | 25 | 7.5 | 5 | 0.286 | 15 | 7.4 | −9 | 0.289 | 17 | 7.2 | −18 | 0.281 |
| | 300 | 10 | 8.0 | 23 | 0.245 | 11 | 8.0 | −7 | 0.262 | 13 | 7.8 | −21 | 0.263 | 15 | 7.4 | −29 | 0.255 |
| 850 | 0 | 38 | 4.1 | 42 | 0.188 | 32 | 5.1 | 32 | 0.244 | 27 | 5.8 | 22 | 0.281 | 24 | 6.3 | 13 | 0.300 |
| | 100 | 25 | 5.9 | 35 | 0.242 | 22 | 6.5 | 21 | 0.284 | 20 | 6.8 | 9 | 0.302 | 19 | 6.9 | −1 | 0.304 |
| | 200 | 17 | 7.1 | 27 | 0.257 | 15 | 7.4 | 10 | 0.286 | 16 | 7.4 | −3 | 0.293 | 17 | 7.2 | −13 | 0.289 |
| | 300 | 11 | 7.9 | 20 | 0.245 | 11 | 8.0 | −1 | 0.268 | 13 | 7.8 | −14 | 0.272 | 15 | 7.4 | −23 | 0.267 |
| 950 | 0 | 39 | 4.0 | 44 | 0.180 | 33 | 5.0 | 34 | 0.237 | 29 | 5.7 | 25 | 0.276 | 26 | 6.1 | 16 | 0.299 |
| | 100 | 27 | 5.7 | 38 | 0.236 | 24 | 6.3 | 24 | 0.262 | 22 | 6.7 | 12 | 0.303 | 21 | 6.7 | 3 | 0.309 |
| | 200 | 19 | 6.9 | 31 | 0.256 | 17 | 7.2 | 14 | 0.290 | 17 | 7.3 | 1 | 0.301 | 18 | 7.1 | −9 | 0.299 |
| | 300 | 13 | 7.7 | 24 | 0.252 | 13 | 7.8 | 5 | 0.279 | 24 | 7.6 | −9 | 0.286 | 17 | 7.3 | −18 | 0.282 |
| 1050 | 0 | 42 | 3.8 | 45 | 0.172 | 36 | 4.7 | 36 | 0.230 | 32 | 5.4 | 26 | 0.272 | 29 | 5.8 | 18 | 0.298 |
| | 100 | 30 | 5.4 | 39 | 0.232 | 26 | 6.1 | 26 | 0.282 | 24 | 6.4 | 14 | 0.306 | 24 | 6.5 | 5 | 0.314 |
| | 200 | 22 | 6.6 | 32 | 0.259 | 20 | 7.0 | 16 | 0.297 | 20 | 7.0 | 4 | 0.311 | 21 | 6.9 | −6 | 0.310 |
| | 300 | 16 | 7.4 | 26 | 0.264 | 15 | 7.6 | 7 | 0.294 | 17 | 7.4 | −6 | 0.301 | 19 | 7.1 | −15 | 0.296 |
| 1150 | 0 | 45 | 3.5 | 46 | 0.166 | 39 | 4.5 | 36 | 0.225 | 35 | 5.1 | 27 | 0.269 | 32 | 5.5 | 18 | 0.296 |
| | 100 | 34 | 5.1 | 39 | 0.229 | 30 | 5.8 | 26 | 0.281 | 28 | 6.1 | 15 | 0.309 | 27 | 6.2 | 6 | 0.318 |
| | 200 | 25 | 6.3 | 33 | 0.265 | 23 | 6.7 | 17 | 0.305 | 23 | 6.7 | 5 | 0.320 | 24 | 6.6 | −5 | 0.318 |
| | 300 | 19 | 7.1 | 26 | 0.277 | 18 | 7.3 | 8 | 0.308 | 20 | 7.1 | −5 | 0.314 | 22 | 6.8 | −14 | 0.307 |

Reflecting layer is Al 400Å thick
$n_1 = n_2 = 2.1$ $n_{mo} = 3.72 + i3.88$ and $3.62 + i3.83$

TABLE 5

| MO = | | 200Å | | | | 250Å | | | | 300Å | | | | 350Å | | | |
|---|---|---|---|---|---|---|---|---|---|---|---|---|---|---|---|---|---|
| x(t) | x(b) | R | \|K\|·10³ | φ | Vsat | R | \|K\|·10³ | φ | Vsat | R | \|K\|·10³ | φ | Vsat | R | \|K\|·10³ | φ | Vsat |
| 50 | 100 | 39 | 4.9 | 12 | 0.300 | 37 | 5.2 | −0 | 0.315 | 37 | 5.2 | −9 | 0.312 | 37 | 5.1 | −17 | 0.300 |
| | 200 | 32 | 5.8 | −0 | 0.327 | 33 | 5.7 | −12 | 0.322 | 35 | 5.5 | −20 | 0.304 | 36 | 5.2 | −26 | 0.283 |
| | 300 | 28 | 6.3 | −11 | 0.329 | 31 | 6.0 | −21 | 0.311 | 33 | 5.7 | −29 | 0.287 | 36 | 5.3 | −33 | 0.263 |
| | 400 | 25 | 6.7 | −20 | 0.317 | 29 | 6.2 | −29 | 0.293 | 33 | 5.8 | −35 | 0.267 | 35 | 5.3 | −39 | 0.244 |
| 150 | 100 | 36 | 5.1 | 10 | 0.305 | 35 | 5.4 | −2 | 0.318 | 35 | 5.4 | −11 | 0.313 | 35 | 5.3 | −19 | 0.299 |
| | 200 | 30 | 6.0 | −2 | 0.328 | 31 | 5.9 | −14 | 0.320 | 33 | 5.7 | −22 | 0.301 | 34 | 5.4 | −28 | 0.280 |
| | 300 | 26 | 6.5 | −13 | 0.324 | 29 | 6.2 | −24 | 0.305 | 31 | 5.9 | −31 | 0.281 | 34 | 5.5 | −36 | 0.258 |
| | 400 | 23 | 6.9 | −22 | 0.307 | 27 | 6.4 | −32 | 0.284 | 31 | 6.0 | −38 | 0.260 | 33 | 5.5 | −42 | 0.237 |
| 250 | 100 | 33 | 5.4 | 9 | 0.310 | 32 | 5.7 | −3 | 0.322 | 32 | 5.7 | −23 | 0.314 | 33 | 5.6 | −20 | 0.299 |
| | 200 | 27 | 6.3 | −4 | 0.326 | 28 | 6.2 | −16 | 0.317 | 30 | 6.0 | −24 | 0.298 | 31 | 5.7 | −30 | 0.277 |
| | 300 | 23 | 6.8 | −15 | 0.317 | 26 | 6.5 | −26 | 0.298 | 29 | 6.1 | −33 | 0.275 | 31 | 5.7 | −37 | 0.253 |
| | 400 | 22 | 7.2 | −25 | 0.295 | 25 | 6.7 | −34 | 0.274 | 28 | 6.2 | −40 | 0.252 | 31 | 5.7 | −43 | 0.231 |
| 350 | 100 | 30 | 5.7 | 8 | 0.322 | 29 | 6.0 | −4 | 0.321 | 29 | 6.0 | −24 | 0.323 | 29 | 5.9 | −21 | 0.297 |
| | 200 | 24 | 6.6 | −5 | 0.321 | 25 | 6.5 | −17 | 0.312 | 27 | 6.3 | −25 | 0.294 | 28 | 6.0 | −31 | 0.273 |
| | 300 | 20 | 7.1 | −16 | 0.307 | 23 | 6.8 | −27 | 0.290 | 26 | 6.4 | −34 | 0.269 | 28 | 6.0 | −39 | 0.249 |
| | 400 | 18 | 7.5 | −26 | 0.282 | 22 | 7.0 | −36 | 0.264 | 25 | 6.5 | −41 | 0.244 | 28 | 6.0 | −45 | 0.226 |

TABLE 5-continued

| MO = | | 200Å | | | | 250Å | | | | 300Å | | | | 350Å | | | |
|---|---|---|---|---|---|---|---|---|---|---|---|---|---|---|---|---|---|
| x(t) | x(b) | R | \|K\|·10³ | φ | Vsat | R | \|K\|·10³ | φ | Vsat | R | \|K\|·10³ | φ | Vsat | R | \|K\|·10³ | φ | Vsat |
| 450 | 100 | 27 | 6.0 | 9 | 0.310 | 26 | 6.3 | −4 | 0.318 | 26 | 6.3 | −14 | 0.310 | 26 | 6.2 | −21 | 0.295 |
| | 200 | 21 | 6.9 | −4 | 0.314 | 22 | 6.8 | −17 | 0.306 | 23 | 6.6 | −25 | 0.289 | 25 | 6.3 | −31 | 0.270 |
| | 300 | 17 | 7.4 | −16 | 0.295 | 20 | 7.1 | −27 | 0.282 | 22 | 6.8 | −34 | 0.263 | 25 | 6.3 | −39 | 0.245 |
| | 400 | 15 | 7.8 | −26 | 0.267 | 18 | 7.3 | −36 | 0.254 | 22 | 6.8 | −42 | 0.238 | 25 | 6.3 | −45 | 0.222 |
| 550 | 100 | 24 | 6.3 | 10 | 0.305 | 23 | 6.6 | −2 | 0.314 | 23 | 6.6 | −12 | 0.307 | 23 | 6.5 | −20 | 0.293 |
| | 200 | 18 | 7.2 | −2 | 0.304 | 19 | 7.1 | −15 | 0.299 | 20 | 6.9 | −24 | 0.285 | 22 | 6.6 | −30 | 0.268 |
| | 300 | 14 | 7.7 | −14 | 0.284 | 27 | 7.4 | −26 | 0.274 | 19 | 7.1 | −33 | 0.259 | 22 | 6.6 | −38 | 0.243 |
| | 400 | 12 | 8.0 | −24 | 0.255 | 16 | 7.6 | −35 | 0.247 | 19 | 7.2 | −41 | 0.234 | 21 | 6.6 | −44 | 0.221 |
| 650 | 100 | 22 | 6.5 | 13 | 0.297 | 21 | 6.8 | 1 | 0.308 | 20 | 6.8 | −9 | 0.304 | 21 | 6.7 | −17 | 0.292 |
| | 200 | 16 | 7.4 | 2 | 0.295 | 17 | 7.3 | −12 | 0.295 | 18 | 7.1 | −21 | 0.284 | 20 | 6.8 | −27 | 0.269 |
| | 300 | 12 | 7.9 | −9 | 0.275 | 15 | 7.7 | −22 | 0.271 | 17 | 7.3 | −30 | 0.259 | 19 | 6.9 | −35 | 0.245 |
| | 400 | 10 | 8.2 | −19 | 0.248 | 13 | 7.8 | −31 | 0.245 | 16 | 7.4 | −38 | 0.235 | 19 | 6.9 | −41 | 0.224 |
| 750 | 100 | 21 | 6.6 | 18 | 0.290 | 20 | 6.9 | 5 | 0.304 | 19 | 6.9 | −5 | 0.303 | 20 | 6.8 | −13 | 0.294 |
| | 200 | 15 | 7.4 | 7 | 0.290 | 16 | 7.4 | −7 | 0.293 | 17 | 7.3 | −16 | 0.286 | 18 | 7.0 | −23 | 0.274 |
| | 300 | 12 | 8.0 | −3 | 0.272 | 13 | 7.8 | −17 | 0.273 | 16 | 7.4 | −26 | 0.264 | 18 | 7.0 | −31 | 0.252 |
| | 400 | 09 | 8.3 | −12 | 0.246 | 12 | 8.0 | −26 | 0.249 | 15 | 7.5 | −33 | 0.243 | 17 | 7.0 | −37 | 0.232 |
| 850 | 100 | 22 | 6.5 | 22 | 0.284 | 20 | 6.8 | 9 | 0.302 | 20 | 6.9 | −1 | 0.306 | 20 | 6.8 | −9 | 0.299 |
| | 200 | 16 | 7.4 | 12 | 0.288 | 16 | 7.4 | −1 | 0.297 | 17 | 7.2 | −11 | 0.293 | IS | 7.0 | −18 | 0.282 |
| | 300 | 12 | 7.9 | 3 | 0.276 | 14 | 7.8 | −11 | 0.281 | 16 | 7.4 | −20 | 0.275 | 17 | 7.0 | −26 | 0.264 |
| | 400 | 10 | 8.3 | −5 | 0.257 | 12 | 8.0 | −19 | 0.261 | 15 | 7.5 | −27 | 0.256 | 17 | 7.0 | −32 | 0.246 |
| 950 | 100 | 24 | 6.3 | 25 | 0.281 | 22 | 6.7 | 13 | 0.304 | 21 | 6.8 | 3 | 0.310 | 22 | 6.7 | −5 | 0.306 |
| | 200 | 18 | 7.2 | 16 | 0.292 | 18 | 7.3 | 3 | 0.293 | 18 | 7.1 | −7 | 0.303 | 20 | 6.8 | −14 | 0.293 |
| | 300 | 14 | 7.7 | 8 | 0.286 | 15 | 7.6 | −6 | 0.293 | 17 | 7.3 | −15 | 0.289 | 19 | 6.9 | −22 | 0.278 |
| | 400 | 11 | 8.1 | 1 | 0.272 | 13 | 7.8 | −14 | 0.278 | 16 | 7.4 | −22 | 0.273 | 18 | 6.9 | −28 | 0.262 |
| 1050 | 100 | 27 | 6.1 | 27 | 0.280 | 25 | 6.4 | 15 | 0.306 | 24 | 6.5 | 6 | 0.315 | 24 | 6.4 | −2 | 0.313 |
| | 200 | 22 | 6.9 | 18 | 0.298 | 20 | 7.0 | 5 | 0.313 | 21 | 6.9 | −4 | 0.313 | 22 | 6.6 | −11 | 0.304 |
| | 300 | 16 | 7.5 | 11 | 0.298 | 17 | 7.4 | −3 | 0.307 | 19 | 7.1 | −12 | 0.302 | 21 | 6.7 | −19 | 0.290 |
| | 400 | 14 | 7.9 | 4 | 0.290 | 16 | 7.6 | −10 | 0.296 | 18 | 7.2 | −19 | 0.289 | 20 | 6.7 | −24 | 0.276 |
| 1150 | 100 | 30 | 5.8 | 27 | 0.280 | 28 | 6.1 | 16 | 0.309 | 27 | 6.2 | 6 | 0.319 | 27 | 6.1 | −1 | 0.317 |
| | 200 | 24 | 6.6 | 19 | 0.305 | 23 | 6.7 | 6 | 0.321 | 24 | 6.6 | −3 | 0.321 | 25 | 6.3 | −10 | 0.311 |
| | 300 | 19 | 7.2 | 11 | 0.311 | 20 | 7.1 | −2 | 0.319 | 22 | 6.8 | −11 | 0.313 | 24 | 6.4 | −17 | 0.300 |
| | 400 | 16 | 7.6 | 5 | 0.307 | 18 | 7.3 | −9 | 0.311 | 21 | 6.9 | −17 | 0.302 | 23 | 6.4 | −23 | 0.287 |

Reflecting layer is Al 400Å thick
$n_1 = 2.1$ $n_2 = 1.5$ $n_{mc} = 3.72 + i3.88$ and $3.62 + i3.83$

TABLE 6

| MO = | | 200Å | | | | 250Å | | | | 300Å | | | | 350Å | | | |
|---|---|---|---|---|---|---|---|---|---|---|---|---|---|---|---|---|---|
| x(t) | x(b) | R | \|K\|·10³ | φ | Vsat | R | \|K\|·10³ | φ | Vsat | R | \|K\|·10³ | φ | Vsat | R | \|K\|·10³ | φ | Vsat |
| 50 | 100 | 31 | 6.2 | −1 | 0.342 | 32 | 6.0 | −14 | 0.330 | 34 | 5.7 | −22 | 0.308 | 35 | 5.4 | −28 | 0.283 |
| | 200 | 26 | 6.7 | −14 | 0.332 | 29 | 6.3 | −25 | 0.309 | 32 | 5.8 | −32 | 0.282 | 35 | 5.4 | −37 | 0.256 |
| | 300 | 24 | 7.0 | −26 | 0.306 | 28 | 6.4 | −35 | 0.280 | 32 | 5.9 | −40 | 0.253 | 35 | 5.3 | −43 | 0.230 |
| | 400 | 22 | 7.2 | −36 | 0.270 | 27 | 6.5 | −43 | 0.247 | 32 | 5.2 | −47 | 0.224 | 35 | 5.3 | −49 | 0.204 |
| 150 | 100 | 28 | 6.4 | −4 | 0.341 | 30 | 6.2 | −16 | 0.327 | 32 | 5.9 | −25 | 0.304 | 33 | 5.6 | −30 | 0.279 |
| | 200 | 24 | 6.9 | −17 | 0.324 | 27 | 6.5 | −28 | 0.301 | 30 | 6.0 | −34 | 0.275 | 33 | 5.6 | −39 | 0.250 |
| | 300 | 21 | 7.2 | −29 | 0.293 | 26 | 6.6 | −38 | 0.269 | 30 | 6.1 | −43 | 0.244 | 33 | 5.5 | −46 | 0.223 |
| | 400 | 20 | 7.4 | −40 | 0.253 | 25 | 6.7 | −46 | 0.233 | 30 | 6.1 | −50 | 0.213 | 33 | 5.4 | −52 | 0.196 |
| 250 | 100 | 25 | 6.7 | −5 | 0.337 | 27 | 6.5 | −18 | 0.322 | 29 | 6.2 | −26 | 0.299 | 31 | 5.9 | −32 | 0.275 |
| | 200 | 21 | 7.2 | −19 | 0.314 | 25 | 6.8 | −30 | 0.292 | 28 | 6.3 | −36 | 0.268 | 32 | 5.8 | −41 | 0.245 |
| | 300 | 19 | 7.5 | −31 | 0.277 | 24 | 6.9 | −40 | 0.257 | 27 | 6.3 | −45 | 0.235 | 31 | 5.8 | −47 | 0.216 |
| | 400 | 17 | 7.6 | −43 | 0.234 | 23 | 7.0 | −49 | 0.219 | 27 | 6.3 | −52 | 0.202 | 31 | 5.7 | −53 | 0.188 |
| 350 | 100 | 22 | 7.0 | −6 | 0.330 | 24 | 6.8 | −19 | 0.316 | 26 | 6.5 | −28 | 0.294 | 28 | 6.2 | −33 | 0.272 |
| | 200 | 18 | 7.5 | −20 | 0.302 | 22 | 7.1 | −31 | 0.282 | 26 | 6.6 | −38 | 0.260 | 28 | 6.1 | −42 | 0.239 |
| | 300 | 16 | 7.8 | −33 | 0.261 | 21 | 7.2 | −42 | 0.244 | 25 | 6.6 | −46 | 0.226 | 28 | 6.0 | −49 | 0.210 |
| | 400 | 15 | 7.9 | −45 | 0.215 | 20 | 7.3 | −51 | 0.205 | 24 | 6.6 | −54 | 0.293 | 28 | 6.0 | −55 | 0.281 |
| 450 | 100 | 19 | 7.4 | −6 | 0.320 | 23 | 7.2 | −19 | 0.308 | 23 | 6.9 | −28 | 0.288 | 25 | 6.5 | −34 | 0.267 |
| | 200 | 15 | 7.8 | −20 | 0.288 | 19 | 7.4 | −31 | 0.273 | 22 | 6.9 | −38 | 0.254 | 24 | 6.4 | −42 | 0.235 |
| | 300 | 13 | 8.1 | −33 | 0.245 | 18 | 7.5 | −42 | 0.234 | 21 | 6.9 | −47 | 0.219 | 24 | 6.4 | −49 | 0.205 |
| | 400 | 12 | 8.2 | −46 | 0.198 | 17 | 7.6 | −52 | 0.294 | 21 | 6.9 | −54 | 0.286 | 25 | 6.3 | −55 | 0.177 |
| 550 | 100 | 16 | 7.6 | −3 | 0.309 | 18 | 7.5 | −17 | 0.301 | 20 | 7.2 | −26 | 0.284 | 21 | 6.8 | −32 | 0.265 |
| | 200 | 13 | 8.1 | −18 | 0.275 | 16 | 7.7 | −30 | 0.265 | 19 | 7.2 | −37 | 0.249 | 21 | 6.7 | −42 | 0.233 |
| | 300 | 11 | 8.3 | −31 | 0.232 | 15 | 7.8 | −41 | 0.226 | 18 | 7.2 | −46 | 0.216 | 21 | 6.7 | −48 | 0.204 |
| | 400 | 09 | 8.5 | −44 | 0.187 | 14 | 7.9 | −51 | 0.187 | 18 | 7.2 | −54 | 0.183 | 22 | 6.6 | −55 | 0.176 |
| 650 | 100 | 15 | 7.8 | 1 | 0.299 | 16 | 7.7 | −13 | 0.295 | 17 | 7.4 | −23 | 0.262 | 29 | 7.0 | −30 | 0.266 |
| | 200 | 11 | 8.3 | −13 | 0.266 | 14 | 7.9 | −26 | 0.261 | 16 | 7.5 | −34 | 0.250 | 12 | 7.0 | −39 | 0.236 |
| | 300 | 09 | 8.5 | −26 | 0.226 | 12 | 8.0 | −37 | 0.225 | 16 | 7.5 | −43 | 0.218 | 19 | 6.9 | −46 | 0.208 |
| | 400 | 07 | 8.7 | −40 | 0.183 | 12 | 8.1 | −47 | 0.188 | 16 | 7.5 | −51 | 0.186 | 19 | 6.8 | −52 | 0.181 |
| 750 | 100 | 14 | 7.9 | 7 | 0.293 | 15 | 7.8 | −8 | 0.294 | 16 | 7.5 | −19 | 0.285 | 18 | 7.2 | −25 | 0.271 |
| | 200 | 10 | 8.4 | −6 | 0.265 | 12 | 8.0 | −21 | 0.256 | 15 | 7.6 | −29 | 0.256 | 17 | 7.1 | −34 | 0.244 |
| | 300 | 08 | 8.6 | −19 | 0.229 | 12 | 8.2 | −32 | 0.232 | 14 | 7.6 | −38 | 0.226 | 17 | 7.1 | −42 | 0.218 |
| | 400 | 06 | 8.8 | −32 | 0.190 | 10 | 8.3 | −42 | 0.198 | 14 | 7.6 | −46 | 0.197 | 17 | 7.0 | −48 | 0.193 |

TABLE 6-continued

| MO = | | 200Å | | | | 250Å | | | | 300Å | | | | 350Å | | | |
|---|---|---|---|---|---|---|---|---|---|---|---|---|---|---|---|---|---|
| x(t) | x(b) | R | \|K\|·10³ | φ | Vsat | R | \|K\|·10³ | φ | Vsat | R | \|K\|·10³ | φ | Vsat | R | \|K\|·10³ | φ | Vsat |
| 850 | 100 | 15 | 7.8 | 12 | 0.292 | 15 | 7.8 | −3 | 0.299 | 16 | 7.5 | −13 | 0.293 | 18 | 7.2 | −20 | 0.281 |
|  | 200 | 11 | 8.3 | 1 | 0.272 | 12 | 8.0 | −14 | 0.275 | 15 | 7.6 | −24 | 0.268 | 17 | 7.1 | −29 | 0.257 |
|  | 300 | 08 | 8.6 | −12 | 0.241 | 11 | 8.2 | −25 | 0.246 | 14 | 7.7 | −33 | 0.242 | 17 | 7.1 | −37 | 0.233 |
|  | 400 | 06 | 8.8 | −22 | 0.207 | 10 | 8.3 | −35 | 0.216 | 14 | 7.7 | −41 | 0.215 | 17 | 7.0 | −43 | 0.209 |
| 950 | 100 | 16 | 7.6 | 16 | 0.297 | 26 | 7.6 | 2 | 0.308 | 17 | 7.4 | −9 | 0.304 | 19 | 7.0 | −16 | 0.293 |
|  | 200 | 12 | 8.1 | 6 | 0.283 | 24 | 7.9 | −9 | 0.290 | 16 | 7.5 | −19 | 0.284 | 18 | 7.0 | −25 | 0.272 |
|  | 300 | 09 | 8.5 | −4 | 0.260 | 12 | 8.1 | −19 | 0.266 | 15 | 7.6 | −27 | 0.261 | 18 | 7.0 | −32 | 0.250 |
|  | 400 | 08 | 8.7 | −14 | 0.231 | 11 | 8.2 | −28 | 0.239 | 14 | 7.6 | −35 | 0.236 | 18 | 6.9 | −38 | 0.228 |
| 1050 | 100 | 19 | 7.4 | 19 | 0.305 | 19 | 7.3 | 5 | 0.319 | 20 | 7.1 | −6 | 0.316 | 21 | 6.8 | −13 | 0.305 |
|  | 200 | 15 | 7.9 | 9 | 0.299 | 16 | 7.7 | −6 | 0.306 | 18 | 7.3 | −15 | 0.299 | 20 | 6.8 | −22 | 0.286 |
|  | 300 | 12 | 8.2 | −1 | 0.282 | 14 | 7.9 | −15 | 0.286 | 17 | 7.4 | −24 | 0.279 | 20 | 6.8 | −29 | 0.266 |
|  | 400 | 10 | 8.5 | −10 | 0.258 | 13 | 8.0 | −24 | 0.263 | 16 | 7.4 | −31 | 0.257 | 20 | 6.7 | −35 | 0.245 |
| 1150 | 100 | 22 | 7.0 | 19 | 0.314 | 22 | 7.0 | 6 | 0.328 | 23 | 6.8 | −5 | 0.325 | 24 | 6.5 | −12 | 0.313 |
|  | 200 | IS | 7.6 | 9 | 0.314 | 19 | 7.3 | −4 | 0.320 | 21 | 7.0 | −14 | 0.312 | 23 | 6.5 | −20 | 0.296 |
|  | 300 | 14 | 7.9 | 0 | 0.302 | 17 | 7.6 | −13 | 0.304 | 20 | 7.1 | −22 | 0.293 | 23 | 6.5 | −27 | 0.277 |
|  | 400 | 12 | 8.2 | −9 | 0.282 | 16 | 7.7 | −22 | 0.283 | 19 | 7.1 | −29 | 0.273 | 23 | 6.5 | −33 | 0.257 |

Reflecting layer is Cu 400Å thick
$n_1 = n_2 = 2.1$  $n_{mc} = 3.72 + i3.88$ and $3.62 + i3.83$

TABLE 7

| MO = | | 150Å | | | | 200Å | | | | 250Å | | | | 300Å | | | |
|---|---|---|---|---|---|---|---|---|---|---|---|---|---|---|---|---|---|
| x(t) | x(b) | R | \|K\|·10³ | φ | Vsat | R | \|K\|·10³ | φ | Vsat | R | \|K\|·10³ | φ | Vsat | R | \|K\|·10³ | φ | Vsat |
| 50 | 0 | 41 | 4.9 | 30 | 0.273 | 37 | 5.4 | 13 | 0.321 | 36 | 5.6 | 0 | 0.333 | 36 | 5.5 | −10 | 0.325 |
|  | 100 | 31 | 6.1 | 16 | 0.326 | 32 | 6.2 | −2 | 0.342 | 32 | 6.0 | −14 | 0.330 | 34 | 5.7 | −22 | 0.308 |
|  | 200 | 24 | 6.9 | 69 | 0.338 | 26 | 6.7 | −14 | 0.332 | 29 | 6.3 | −25 | 0.309 | 32 | 5.8 | −32 | 0.282 |
|  | 300 | 29 | 7.5 | −10 | 0.321 | 24 | 7.0 | −26 | 0.306 | 28 | 6.4 | −35 | 0.280 | 32 | 5.9 | −40 | 0.253 |
| 150 | 0 | 39 | 5.2 | 28 | 0.282 | 35 | 5.6 | 12 | 0.327 | 34 | 5.8 | −2 | 0.336 | 34 | 5.7 | −12 | 0.325 |
|  | 100 | 28 | 6.3 | 14 | 0.329 | 28 | 6.4 | −4 | 0.341 | 30 | 6.2 | −16 | 0.327 | 32 | 5.9 | −25 | 0.304 |
|  | 200 | 22 | 7.2 | 0 | 0.332 | 24 | 6.9 | −17 | 0.324 | 27 | 6.6 | −28 | 0.302 | 30 | 6.0 | −34 | 0.275 |
|  | 300 | 17 | 7.7 | −13 | 0.307 | 21 | 7.2 | −29 | 0.293 | 26 | 6.6 | −38 | 0.269 | 30 | 6.2 | −43 | 0.244 |
| 250 | 0 | 36 | 5.5 | 28 | 0.269 | 32 | 5.9 | 10 | 0.330 | 31 | 6.1 | −3 | 0.337 | 31 | 6.0 | −14 | 0.325 |
|  | 100 | 25 | 6.7 | 13 | 0.328 | 25 | 6.7 | −5 | 0.337 | 27 | 6.5 | −18 | 0.322 | 29 | 6.2 | −26 | 0.299 |
|  | 200 | 19 | 7.5 | −2 | 0.322 | 21 | 7.2 | −19 | 0.314 | 25 | 6.8 | −30 | 0.292 | 28 | 6.3 | −36 | 0.268 |
|  | 300 | 14 | 8.0 | −16 | 0.289 | 19 | 7.5 | −31 | 0.277 | 24 | 6.9 | −40 | 0.257 | 27 | 6.3 | −45 | 0.235 |
| 350 | 0 | 32 | 5.8 | 27 | 0.293 | 29 | 6.3 | 10 | 0.331 | 28 | 6.4 | −4 | 0.336 | 28 | 6.3 | −15 | 0.323 |
|  | 100 | 22 | 7.0 | 12 | 0.322 | 22 | 7.0 | −6 | 0.330 | 24 | 6.8 | −19 | 0.316 | 26 | 6.5 | −28 | 0.294 |
|  | 200 | 16 | 7.8 | −8 | 0.307 | IS | 7.5 | −20 | 0.302 | 22 | 7.1 | −31 | 0.282 | 25 | 6.6 | −38 | 0.260 |
|  | 300 | 12 | 8.3 | −17 | 0.268 | 16 | 7.8 | −33 | 0.261 | 21 | 7.2 | −42 | 0.244 | 25 | 6.6 | −46 | 0.226 |
| 450 | 0 | 29 | 6.1 | 28 | 0.291 | 25 | 6.6 | 20 | 0.328 | 24 | 6.7 | −4 | 0.332 | 25 | 6.7 | −15 | 0.319 |
|  | 100 | 19 | 7.3 | 13 | 0.312 | 19 | 7.4 | −6 | 0.320 | 22 | 7.2 | −19 | 0.308 | 23 | 6.9 | −28 | 0.288 |
|  | 200 | 13 | 8.1 | −1 | 0.289 | 15 | 7.8 | −20 | 0.288 | 19 | 7.4 | −31 | 0.273 | 22 | 6.9 | −38 | 0.254 |
|  | 300 | 09 | 8.5 | −16 | 0.246 | 13 | 8.1 | −33 | 0.245 | 18 | 7.5 | −42 | 0.234 | 21 | 6.9 | −47 | 0.219 |
| 550 | 0 | 27 | 6.4 | 30 | 0.284 | 23 | 6.9 | 12 | 0.320 | 21 | 7.0 | −2 | 0.325 | 22 | 7.0 | −13 | 0.315 |
|  | 100 | 17 | 7.5 | 16 | 0.296 | 16 | 7.6 | −3 | 0.309 | 18 | 7.5 | −17 | 0.301 | 20 | 7.2 | −26 | 0.284 |
|  | 200 | 11 | 8.3 | 3 | 0.271 | 13 | 8.1 | −18 | 0.275 | 16 | 7.7 | −30 | 0.265 | 19 | 7.2 | −37 | 0.249 |
|  | 300 | 07 | 8.7 | −12 | 0.226 | 11 | 8.3 | −31 | 0.232 | 15 | 7.8 | −41 | 0.226 | 18 | 7.2 | −46 | 0.216 |
| 650 | 0 | 25 | 6.5 | 33 | 0.273 | 22 | 7.1 | 16 | 0.311 | 19 | 7.2 | 1 | 0.319 | 19 | 7.2 | −10 | 0.311 |
|  | 100 | IS | 7.7 | 22 | 0.281 | 15 | 7.8 | 1 | 0.299 | 16 | 7.7 | −13 | 0.295 | 17 | 7.4 | −23 | 0.282 |
|  | 200 | 09 | 8.4 | 9 | 0.255 | 11 | 8.3 | −13 | 0.266 | 14 | 7.9 | −26 | 0.261 | 26 | 7.5 | −34 | 0.250 |
|  | 300 | 06 | 8.9 | −4 | 0.214 | 09 | 8.5 | −26 | 0.226 | 12 | 8.0 | −37 | 0.225 | 16 | 7.5 | −43 | 0.218 |
| 750 | 0 | 24 | 6.6 | 37 | 0.260 | 20 | 7.1 | 20 | 0.301 | 18 | 7.3 | 6 | 0.314 | 18 | 7.3 | −6 | 0.310 |
|  | 100 | 15 | 7.7 | 27 | 0.269 | 14 | 7.9 | 7 | 0.293 | 15 | 7.8 | −8 | 0.294 | 16 | 7.5 | −19 | 0.285 |
|  | 200 | 09 | 8.4 | 17 | 0.247 | 10 | 8.4 | −6 | 0.265 | 12 | 8.0 | −21 | 0.265 | 15 | 7.6 | −29 | 0.256 |
|  | 300 | 06 | 8.9 | 6 | 0.221 | 08 | 8.6 | −19 | 0.229 | 11 | 8.2 | −32 | 0.232 | 14 | 7.6 | −38 | 0.226 |
| 850 | 0 | 26 | 6.5 | 40 | 0.249 | 21 | 7.1 | 24 | 0.294 | 19 | 7.3 | 10 | 0.312 | 19 | 7.3 | −1 | 0.313 |
|  | 100 | 16 | 7.6 | 31 | 0.262 | 15 | 7.8 | 12 | 0.292 | 15 | 7.8 | −3 | 0.299 | 16 | 7.5 | −13 | 0.293 |
|  | 200 | 11 | 8.3 | 23 | 0.247 | 11 | 8.3 | 1 | 0.272 | 22 | 8.0 | −14 | 0.275 | 15 | 7.6 | −24 | 0.268 |
|  | 300 | 07 | 8.8 | 15 | 0.218 | 08 | 8.6 | −11 | 0.241 | 11 | 8.2 | −25 | 0.246 | 14 | 7.7 | −33 | 0.242 |
| 950 | 0 | 28 | 6.2 | 43 | 0.241 | 23 | 6.9 | 28 | 0.291 | 22 | 7.1 | 14 | 0.314 | 20 | 7.1 | 3 | 0.318 |
|  | 100 | 19 | 7.3 | 35 | 0.261 | 16 | 7.6 | 16 | 0.297 | 26 | 7.6 | 2 | 0.308 | 17 | 7.4 | −9 | 0.304 |
|  | 200 | 13 | 8.1 | 27 | 0.255 | 12 | 8.2 | 6 | 0.283 | 14 | 7.9 | −9 | 0.290 | 16 | 7.5 | −19 | 0.284 |
|  | 300 | 08 | 8.6 | 20 | 0.234 | 09 | 8.5 | −4 | 0.260 | 22 | 8.1 | −29 | 0.266 | 25 | 7.6 | −27 | 0.262 |
| 1050 | 0 | 31 | 5.9 | 44 | 0.237 | 26 | 6.6 | 29 | 0.291 | 23 | 6.8 | 16 | 0.317 | 23 | 6.8 | 6 | 0.325 |
|  | 100 | 22 | 7.0 | 36 | 0.265 | 19 | 7.4 | 19 | 0.305 | 19 | 7.3 | 5 | 0.319 | 20 | 7.1 | −6 | 0.316 |
|  | 200 | 15 | 7.8 | 29 | 0.267 | 15 | 7.9 | 9 | 0.299 | 16 | 7.7 | −6 | 0.306 | 18 | 7.3 | −15 | 0.299 |
|  | 300 | 11 | 8.3 | 22 | 0.254 | 12 | 8.2 | −1 | 0.282 | 14 | 7.9 | −15 | 0.286 | 17 | 7.4 | −24 | 0.279 |

TABLE 7-continued

| MO = | | 150Å | | | | 200Å | | | | 250Å | | | | 300Å | | | |
|---|---|---|---|---|---|---|---|---|---|---|---|---|---|---|---|---|---|
| x(t) | x(b) | R | $\|K\| \cdot 10^3$ | φ | Vsat | R | $\|K\| \cdot 10^3$ | φ | Vsat | R | $\|K\| \cdot 10^3$ | φ | Vsat | R | $\|K\| \cdot 10^3$ | φ | Vsat |
| 1150 | 0 | 34 | 5.6 | 44 | 0.235 | 29 | 6.2 | 30 | 0.292 | 27 | 6.5 | 17 | 0.321 | 26 | 6.5 | 6 | 0.330 |
|  | 100 | 25 | 6.7 | 36 | 0.271 | 22 | 7.0 | 19 | 0.314 | 22 | 7.0 | 6 | 0.328 | 23 | 6.8 | −5 | 0.325 |
|  | 200 | 18 | 7.5 | 29 | 0.282 | 18 | 7.6 | 9 | 0.314 | 19 | 7.3 | −4 | 0.320 | 21 | 7.0 | −14 | 0.322 |
|  | 300 | 14 | 8.0 | 21 | 0.276 | 14 | 7.9 | 0 | 0.302 | 17 | 7.6 | −13 | 0.304 | 20 | 7.1 | −22 | 0.293 |

Reflecting layer is Cu 400Å thick
$n_1 = n_2 = 2.1$ $n_{mc} = 3.72 + i3.88$ and $3.62 + i3.83$

TABLE 8

| MO = | | 200Å | | | | 250Å | | | | 300Å | | | | 350Å | | | |
|---|---|---|---|---|---|---|---|---|---|---|---|---|---|---|---|---|---|
| x(t) | x(b) | R | $\|K\| \cdot 10^3$ | φ | Vsat | R | $\|K\| \cdot 10^3$ | φ | Vsat | R | $\|K\| \cdot 10^3$ | φ | Vsat | R | $\|K\| \cdot 10^3$ | φ | Vsat |
| 50 | 100 | 31 | 6.1 | 0 | 0.342 | 32 | 6.0 | −12 | 0.332 | 34 | 5.7 | −21 | 0.311 | 36 | 5.4 | −27 | 0.286 |
|  | 200 | 27 | 6.6 | −11 | 0.338 | 30 | 6.3 | −22 | 0.317 | 33 | 5.8 | −30 | 0.290 | 35 | 5.4 | −35 | 0.264 |
|  | 300 | 25 | 6.9 | −20 | 0.322 | 29 | 6.4 | −30 | 0.296 | 32 | 5.9 | −36 | 0.268 | 35 | 5.4 | −40 | 0.243 |
|  | 400 | 23 | 7.1 | −28 | 0.300 | 28 | 6.5 | −37 | 0.274 | 32 | 5.9 | −42 | 0.248 | 35 | 5.3 | −45 | 0.224 |
| 150 | 100 | 29 | 6.4 | −2 | 0.342 | 30 | 6.2 | −15 | 0.330 | 32 | 5.9 | −23 | 0.307 | 34 | 5.6 | −30 | 0.282 |
|  | 200 | 25 | 6.8 | −13 | 0.332 | 28 | 6.5 | −25 | 0.310 | 31 | 6.0 | −32 | 0.284 | 33 | 5.6 | −37 | 0.258 |
|  | 300 | 22 | 7.1 | −23 | 0.311 | 27 | 6.6 | −33 | 0.286 | 30 | 6.1 | −39 | 0.260 | 33 | 5.6 | −42 | 0.237 |
|  | 400 | 21 | 7.3 | −31 | 0.286 | 26 | 6.7 | −40 | 0.262 | 30 | 6.1 | −44 | 0.238 | 33 | 5.5 | −47 | 0.217 |
| 250 | 100 | 26 | 6.7 | −4 | 0.339 | 27 | 6.5 | −16 | 0.326 | 29 | 6.2 | −25 | 0.303 | 31 | 5.9 | −31 | 0.279 |
|  | 200 | 22 | 7.1 | −15 | 0.323 | 25 | 6.7 | −27 | 0.302 | 28 | 6.3 | −34 | 0.277 | 31 | 5.9 | −39 | 0.253 |
|  | 300 | 20 | 7.4 | −25 | 0.298 | 24 | 6.9 | −35 | 0.276 | 28 | 6.3 | −41 | 0.252 | 31 | 5.8 | −44 | 0.230 |
|  | 400 | 18 | 7.6 | −34 | 0.269 | 23 | 7.0 | −42 | 0.249 | 27 | 6.3 | −47 | 0.228 | 31 | 5.8 | −49 | 0.210 |
| 350 | 100 | 23 | 7.0 | −4 | 0.333 | 24 | 6.8 | −17 | 0.320 | 26 | 6.5 | −26 | 0.298 | 28 | 6.2 | −32 | 0.275 |
|  | 200 | 19 | 7.4 | −16 | 0.312 | 22 | 7.1 | −28 | 0.293 | 25 | 6.6 | −35 | 0.270 | 28 | 6.1 | −40 | 0.248 |
|  | 300 | 17 | 7.7 | −27 | 0.283 | 21 | 7.2 | −37 | 0.264 | 25 | 6.6 | −42 | 0.244 | 28 | 6.1 | −46 | 0.224 |
|  | 400 | 16 | 7.9 | −36 | 0.252 | 20 | 7.3 | −44 | 0.236 | 24 | 6.6 | −48 | 0.219 | 28 | 6.1 | −50 | 0.203 |
| 450 | 100 | 20 | 7.3 | −4 | 0.323 | 21 | 7.2 | −17 | 0.312 | 23 | 6.9 | −26 | 0.292 | 25 | 6.5 | −33 | 0.271 |
|  | 200 | 16 | 7.8 | −16 | 0.299 | 19 | 7.4 | −28 | 0.283 | 22 | 6.9 | −36 | 0.264 | 24 | 6.5 | −40 | 0.244 |
|  | 300 | 14 | 8.0 | −27 | 0.268 | 18 | 7.5 | −37 | 0.254 | 21 | 7.0 | −43 | 0.237 | 24 | 6.4 | −46 | 0.220 |
|  | 400 | 13 | 8.2 | −36 | 0.236 | 17 | 7.6 | −44 | 0.225 | 21 | 7.0 | −49 | 0.212 | 24 | 6.4 | −52 | 0.199 |
| 550 | 100 | 17 | 7.6 | −2 | 0.312 | 18 | 7.5 | −16 | 0.304 | 20 | 7.2 | −25 | 0.288 | 21 | 6.8 | −31 | 0.268 |
|  | 200 | 13 | 8.0 | −14 | 0.286 | 16 | 7.7 | −26 | 0.275 | 19 | 7.2 | −34 | 0.259 | 21 | 6.8 | −39 | 0.242 |
|  | 300 | 11 | 8.3 | −24 | 0.255 | 15 | 7.8 | −35 | 0.246 | 18 | 7.3 | −42 | 0.233 | 21 | 6.7 | −45 | 0.218 |
|  | 400 | 10 | 8.4 | −34 | 0.223 | 14 | 7.9 | −43 | 0.218 | 18 | 7.3 | −48 | 0.208 | 21 | 6.7 | −50 | 0.198 |
| 650 | 100 | 15 | 7.8 | 3 | 0.302 | 16 | 7.7 | −12 | 0.299 | 17 | 7.4 | −22 | 0.286 | 19 | 7.0 | −29 | 0.269 |
|  | 200 | 12 | 8.2 | −9 | 0.277 | 14 | 7.9 | −23 | 0.271 | 16 | 7.5 | −31 | 0.259 | 19 | 7.0 | −36 | 0.244 |
|  | 300 | 10 | 8.5 | −19 | 0.247 | 13 | 8.0 | −32 | 0.244 | 16 | 7.5 | −39 | 0.234 | 19 | 7.0 | −42 | 0.222 |
|  | 400 | 08 | 8.6 | −29 | 0.217 | 12 | 8.1 | −40 | 0.217 | 16 | 7.5 | −45 | 0.211 | 19 | 6.9 | −47 | 0.202 |
| 750 | 100 | 14 | 7.9 | 8 | 0.295 | 15 | 7.8 | −7 | 0.297 | 16 | 7.5 | −17 | 0.288 | 18 | 7.2 | −24 | 0.274 |
|  | 200 | 11 | 8.3 | −3 | 0.274 | 13 | 8.0 | −17 | 0.274 | 15 | 7.6 | −26 | 0.264 | 17 | 7.2 | −32 | 0.251 |
|  | 300 | 09 | 8.6 | −12 | 0.248 | 12 | 8.2 | −26 | 0.249 | 14 | 7.7 | −34 | 0.241 | 17 | 7.1 | −38 | 0.231 |
|  | 400 | 07 | 8.7 | −21 | 0.221 | 11 | 8.2 | −34 | 0.220 | 14 | 7.7 | −40 | 0.220 | 17 | 7.1 | −43 | 0.212 |
| 850 | 100 | 15 | 7.8 | 14 | 0.294 | 15 | 7.7 | −1 | 0.301 | 16 | 7.5 | −12 | 0.296 | 18 | 7.2 | −19 | 0.284 |
|  | 200 | 12 | 8.2 | 4 | 0.278 | 13 | 8.0 | −11 | 0.282 | 15 | 7.6 | −21 | 0.276 | 17 | 7.2 | −27 | 0.264 |
|  | 300 | 09 | 8.5 | −5 | 0.257 | 12 | 8.2 | −20 | 0.261 | 14 | 7.7 | −28 | 0.255 | 17 | 7.1 | −33 | 0.245 |
|  | 400 | 08 | 8.7 | −13 | 0.234 | 11 | 8.3 | −27 | 0.240 | 14 | 7.7 | −34 | 0.236 | 17 | 7.1 | −38 | 0.228 |
| 950 | 100 | 17 | 7.6 | 18 | 0.298 | 17 | 7.6 | 3 | 0.310 | 18 | 7.4 | −8 | 0.307 | 19 | 7.0 | −15 | 0.296 |
|  | 200 | 13 | 8.1 | 9 | 0.289 | 14 | 7.9 | −6 | 0.296 | 16 | 7.5 | −16 | 0.290 | 18 | 7.1 | −23 | 0.278 |
|  | 300 | 11 | 8.4 | 1 | 0.273 | 13 | 8.0 | −14 | 0.279 | 15 | 7.6 | −23 | 0.273 | 18 | 7.0 | −29 | 0.261 |
|  | 400 | 09 | 8.6 | −6 | 0.255 | 12 | 8.1 | −21 | 0.261 | 15 | 7.6 | −29 | 0.256 | 18 | 7.0 | −34 | 0.246 |
| 1050 | 100 | 20 | 7.3 | 20 | 0.305 | 19 | 7.3 | 6 | 0.320 | 20 | 7.1 | −5 | 0.318 | 21 | 6.8 | −12 | 0.307 |
|  | 200 | 16 | 7.8 | 12 | 0.303 | 17 | 7.6 | −3 | 0.311 | 19 | 7.3 | −13 | 0.305 | 21 | 6.8 | −19 | 0.292 |
|  | 300 | 13 | 8.1 | 4 | 0.292 | 15 | 7.8 | −10 | 0.297 | 18 | 7.3 | −20 | 0.290 | 20 | 6.8 | −25 | 0.277 |
|  | 400 | 11 | 8.3 | −2 | 0.278 | 14 | 7.9 | −17 | 0.282 | 17 | 7.4 | −25 | 0.275 | 20 | 6.8 | −30 | 0.262 |
| 1150 | 100 | 23 | 7.0 | 20 | 0.313 | 22 | 7.0 | 7 | 0.327 | 24 | 6.8 | −4 | 0.327 | 24 | 6.5 | −11 | 0.315 |
|  | 200 | 19 | 7.5 | 12 | 0.316 | 20 | 7.3 | −2 | 0.324 | 22 | 7.0 | −11 | 0.317 | 24 | 6.5 | −18 | 0.302 |
|  | 300 | 16 | 7.8 | 5 | 0.310 | 18 | 7.5 | −9 | 0.314 | 20 | 7.1 | −18 | 0.304 | 23 | 6.5 | −24 | 0.287 |
|  | 400 | 14 | 8.1 | −1 | 0.299 | 17 | 7.6 | −15 | 0.301 | 20 | 7.1 | −24 | 0.290 | 23 | 6.5 | −28 | 0.273 |

Reflecting layer is Cu 400Å thick
$n_1 = 2.1$ $n_2 = 1.5$ $n_{mc} = 3.72 + i3.88$ and $3.62 + i3.83$

TABLE 9

| M | x(t) | MO | x(b) | R | $\|K\| \cdot 10^3$ | φ | Vsat | M | x(t) | MO | x(b) | R | $\|K\| \cdot 10^3$ | φ | Vsat |
|---|---|---|---|---|---|---|---|---|---|---|---|---|---|---|---|
| 200 | 850 | 200 | 100 | 22 | 6.5 | +2 | 0.303 | 300 | 550 | 200 | 200 | 20 | 6.9 | −6 | 0.311 |
| 200 | 750 | 250 | 100 | 22 | 6.4 | −2 | 0.303 | 300 | 750 | 250 | 100 | 22 | 6.6 | +1 | 0.312 |

TABLE 9-continued

| M | x(t) | MO | x(b) | R | $|K| \cdot 10^3$ | φ | Vsat |
|---|---|---|---|---|---|---|---|
| 300 | 850 | 250 | 100 | 22 | 6.6 | +5 | 0.310 |
| 400 | 550 | 200 | 200 | 20 | 7.0 | −5 | 0.313 |
| 400 | 650 | 200 | 200 | 18 | 7.2 | −2 | 0.307 |
| 400 | 750 | 250 | 100 | 22 | 6.7 | +2 | 0.314 |
| 400 | 850 | 250 | 100 | 22 | 6.7 | +5 | 0.312 |
| 400 | 850 | 300 | 100 | 22 | 6.8 | −5 | 0.312 |
| 2000 | 450 | 200 | 200 | 23 | 6.7 | −6 | 0.321 |
| 2000 | 550 | 200 | 200 | 20 | 7.0 | −5 | 0.314 |
| 2000 | 750 | 250 | 100 | 22 | 6.7 | +2 | 0.315 |
| 2000 | 850 | 250 | 100 | 18 | 7.3 | −7 | 0.304 |

Reflecting layer is Al
$n_1 = n_2 = 2.0$  $n_{mc} = 3.72 + i3.88$ and $3.62 + i3.83$

APPENDIX A

In this program, which is in Fortran, $N_1$–$N_6$ represent the indices of refraction of the following:

$N_1$: the atmosphere (air)
$N_2$: the metal reflecting layer
$N_3$: the second dielectric layer
$N_4$: the magneto-optic layer
$N_5$: the first dielectric layer
$N_6$: the substrate.

The thickness and refractive index of the metal reflecting layer is input as a single value. The program calculates the characteristics of the quadrilayer structure for a range of thicknesses of the magneto-optic layer, the first dielectric layer and the second dielectric layer. The subscript "1" generally represents the minimum thickness, the subscript "2" represents the maximum thickness, and the subscript "3" represents the incremental steps within each range.

$K_1$, $K_2$ and $K_3$ refer to the thickness of the magneto-optic layer $L_1$, $L_2$ and $L_3$ refer to the thickness of the second dielectric layer $M_1$, $M_2$ and $M_3$ refer to the thickness of the first dielectric layer The appropriate values for these layers are input at the places indicated in the program. All thicknesses are expressed in Angstrom units.

Lambda represents the wavelength of the incident polarized light.

The characteristics to be calculated are represented in the program as follows:

R=the reflectivity of the structure
RY=K (the magneto-optic figure of merit)
  =Θ√R, where Θ is the magneto-optic Kerr rotation
RYP=Vsat=√R·100|K|·Cos φ
PHIE=φ (the phase shift)

```
        IMPLICIT REAL*8(A-H,O-Z)
        REAL*8 LAMDA, KD, IO, KERR
        COMPLEX*16 KO,E4(2),N1,N2,N3,N4(2),N5,N6,A(20)
C***************************************************************
        INVERT=1
        N1=(1.0,0.)
C********  ALUMINUM ********
C        N2=(2.70,8.30)
C        WRITE(6,201)
201     FORMAT(1X,'ALUMINUM REFLECTING LAYER'/)
C********  COPPER **********
        N2=(0.26,5.26)
        WRITE(6,202)
202     FORMAT(1X,'COPPER REFLECTING LAYER'/)
C********  GOLD *************
C        N2=(0.07,5.00)
C        WRITE(6,203)
203     FORMAT(1X,'GOLD REFLECTING LAYER'/)
C********  SILVER ********
C        N2=(0.27,5.79)
C        WRITE(6,204)
204     FORMAT(1X,'SILVER REFLECTING LAYER'/)
C****************************
        WRITE(6,301)
301     FORMAT(/5X,'ENTER N AND K FOR TOP DIELECTRIC LAYER')
        READ(5,*)AUX1,AUX2
        N3=AUX1*(1.,0.)+AUX2*(0.,1.)
        WRITE(6,303)
303     FORMAT(/5X,'ENTER N AND K FOR BOTTOM DIELECTRIC LAYER')
        READ(5,*)AUX8,AUX9
        N5=AUX8*(1.,0.)+AUX9*(0.,1.)
        E4(1)=(-1.4,28.3)
        E4(2)=(0.57,-0.12)
        N4(1)=CDSQRT(E4(1)+(0.,1.)*E4(2))
        N4(2)=CDSQRT(E4(1)-(0.,1.)*E4(2))
        WRITE(6,302)
302     FORMAT(/5X,'ENTER N AND K FOR SUBSTRATE')
        READ(5,*)AUX3,AUX4
        N6*AUX3*(1.,0.)+AUX4*(1.,0.)
        SUB=REAL(N6)
        PLF=(4.*SUB)/((1.+SUB)**2)
        LAMDA=8300.
C       ETA=0.5
C       PO=1.E-3
C       BW=1.E7
C       IO=12.5E-12
```

```
C         KD=.02
C         EC=1.6E-19
          KO=(0.,4.)*3.1415926536/LAMDA
*************************************************************
          WRITE(*,9) SUB,PLF
9         FORMAT(1X,F7.4,3X,F7.4)
          WRITE(*,10)
10        FORMAT('ENTER REFLECTING LAYER''S THICKNESS: ',$)
          READ(*,*) TR
          WRITE(*,30)
30        FORMAT(/,'THICKNESS VARIES BETWEEN X1 AND X2 IN STEPS OF
          X3',/)
40        FORMAT('ENTER X1, X2 AND X3 FOR THE',A19,$)
20        WRITE(*,40)'MAGNETIC LAYER:'
          CALL SUB1(K1,K2,K3)
          IF(K1.LE.1)GOTO 20
          WRITE(*,40)'X-TOP LAYER:'
          CALL SUB1(L1,L2,L3)
          WRITE(*,40) 'X-BOTTOM LAYER:'
          CALL SUB1 (M1,M2,M3)
C*************************************************************
          A(1)=(N2-N1)/(N2+N1)*CDEXP(KO*N2*TR)
          A(2)=(N3-N2)/(N3+N2)
          A(3)=(A(1)+A(2))/(1.+A(1)*A(2))
          A(4)=(N4(1)-N3)/(N4(1)+N3)
          A(5)=(N4(2)-N3)/(N4(2)+N3)
          A(6)=(N5-N4(1))/(N5+N4(1))
          A(7)=(N5-N4(2))/(N5+N4(2))
          A(8)=(N6-N5)/(N6+N5)
C*************************************************************
          OPEN(UNIT=20,FILE='E:ffORPG—PR1.PRN')
          WRITE(20,99)
99        FORMAT(1X,'INPUT DATA'/)
          WRITE(20,96) N6
96        FORMAT(1X,'N(SUBSTR) = ',2(F5.2,1X))
          WRITE(20,100) TR,N2,N3,N4,N5
100       FORMAT(1X,F5.0,2X,8(F5.2.1X)/)
          WRITE(20,97)
97        FORMAT(1X,'X-TOP',2X,'M-O',2X,'X-
          BOT,4X,'RX2',7X,'RY',10X,'PHI',5X
+         ,8X,'R*RY*C(PHI)')
C*************************************************************
          DO 140 K=K1,K2,K3
          TF=FLOAT(K-1)
          A(9)=CDEXP(KO*N4(1)*TF)
          A(10)=CDEXP(KO*N4(2)*TF)
          DO 140 L=L1,L2,L3
          TI=FLOAT(L-1)
          A(11)=A(3)*CDEXP(KO*N3*TI)
          A(12)=(A(4)+A(11))/(1.+A(4)*A(11))*A(9)
          A(13)=(A(5)+A(11))/(1.+A(5)*A(11))*A(10)
          A(14)=(A(6)+A(12))/(1.+A(6)*A(12))
          A(15)=(A(7)+A(13))/(1.+A(7)*A(13))
          DO 140 M=M1,M2,M3
          TC=FLOAT(M-1)
          A(16)=CDEXP(KO*N5*TC)
          A(17)=A(14)*A(16)
          A(18)=A(15)*A(16)
          A(19)=(A(8)+A(17))/(1.+A(8)*A(17))
          A(20)=(A(8)+A(18))/(1.+A(8)*A(18))
          RX2=.25*CDABS((A(19)+A(20))**2)
          RX2=RX2*PLF*PLF
          RY2=.25*CDABS((A(19)-A(20))**2)
          RY2=RY2*PLF*PLF
          PHI=1.5708+(DIMAG(DCLOG((1.+A(19)/A(20))/(1.-
          A(19)/A(20)))))
C*************************************************************
C         RR=DSQRT(4.*RX2*RY2*DCOS(PHI)**2+(RX2-RY2)**2)
C         KERR=90.*DACOS((RX2-RY2)/RR)/3.1415926536
C         ELL=180.*DATAN(DSQRT((RX2+RY2-RR)/(RX2+RY2+RR)))/3.14159
          R=RX2+RY2
          RY=100.*DSQRT(RY2)
          RYP=RY*DCOS(PHI)
          PHID=PHI*180./3.1415926536
          RYPR=RYP*DSQRT(RX2)
          WRITE(20,90) TI,TF,TC,TX2,RY,PHID,RYPR
90        FORMAT(1X,3(F5.0,1X),F6.4,4X,F6.4,6X,F7.2,6X,F7.4)
140       CONTINUE
          END
C*************************************************************
```

-continued

```
SUBROUTINE SUB1(T1,T2,T3)
REAL*8 X1,X2,X3
READ(*,*) X1,X2,X3
IF(X2.LT.X1) X2=X1
IF(X3.LE.0.) X3=1.
I1=IDNINT(X1+1.)
I2=IDNINT(X2+1.)
I3=IDNINT(X3)
RETURN
END
```

We claim:

1. A magneto-optic storage medium for storing and retrieving data by exposure to a polarized light beam, said storage medium comprising a quadrilayer structure arranged in the following sequence and bonded to a transparent substrate:

a first dielectric layer having a thickness in the range of 250 Å to 1150 Å and comprising a material having a refractive index greater than 1.9;

a magneto-optic layer having a thickness in the range of 150 Å to 350 Å;

a second dielectric layer having a thickness in the range of 50 Å to 400 Å and comprising a material having a refractive index greater than 1.4; and a metal reflecting layer having a thickness in the range of 150 Å to 500 Å;

the actual thickness of each of said layers within said respective ranges and the refractive index of each of said first and second dielectric layers being selected such that said storage medium exhibits a reflectivity in the range of 15% to 25% and a phase shift in the range of −12 degrees to +12 degrees in the presence of said polarized light beam.

2. The magneto-optic storage medium claimed in claim 1 wherein the second dielectric layer comprises a dielectric material selected from the group consisting of ZYA and $SiO_2$.

3. The magneto-optic storage medium claimed in claim 1 wherein the second dielectric layer comprises a material having a thermal conductivity of less than 0.06 Joules/sec-cm-°K.

4. The magneto-optic storage medium claimed in claim 1 wherein the metal reflecting layer is made of a material which comprises at least one metal selected from the group consisting of Al, Cu, Ag and Au.

5. The magneto-optic storage medium claimed in claim 1 wherein the transparent substrate is bonded to the first dielectric layer.

6. The magneto-optic storage medium claimed in claim 1 additionally comprising a protective layer bonded to the quadrilayer structure on the side thereof opposite to the transparent substrate.

7. The magneto-optic storage medium claimed in claim 1 wherein at least one of said layers is sputter deposited.

8. The magneto-optic storage medium claimed in claim 4 wherein the metal reflecting layer is made of a material which comprises Al alloyed with Ti or Ta.

* * * * *